United States Patent
Sakamoto et al.

(10) Patent No.: US 11,700,676 B2
(45) Date of Patent: Jul. 11, 2023

(54) DIELECTRIC CONSTANT ESTIMATION DEVICE AND MICROWAVE HEATING APPARATUS PROVIDED WITH DIELECTRIC CONSTANT ESTIMATION DEVICE

(71) Applicants: Panasonic Corporation, Kadoma (JP); WHIRLPOOL CORPORATION, Benton Harbor, MI (US)

(72) Inventors: Yoshihiro Sakamoto, Kyoto (JP); Fumitaka Ogasawara, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 378 days.

(21) Appl. No.: 17/044,450

(22) PCT Filed: Apr. 6, 2018

(86) PCT No.: PCT/JP2018/014729
§ 371 (c)(1),
(2) Date: Oct. 1, 2020

(87) PCT Pub. No.: WO2019/193748
PCT Pub. Date: Oct. 10, 2019

(65) Prior Publication Data
US 2021/0037620 A1    Feb. 4, 2021

(51) Int. Cl.
*H05B 6/64* (2006.01)
*H05B 6/68* (2006.01)
*H05B 6/72* (2006.01)

(52) U.S. Cl.
CPC ........... *H05B 6/6438* (2013.01); *H05B 6/645* (2013.01); *H05B 6/686* (2013.01); *H05B 6/72* (2013.01)

(58) Field of Classification Search
CPC . F25D 23/12; H05B 2206/044; H05B 6/6438; H05B 6/645; H05B 6/686;
(Continued)

(56) References Cited

U.S. PATENT DOCUMENTS

| 4,460,814 A * | 7/1984 | Diesch ................. H05B 6/6452 |
| | | 343/873 |
| 7,015,441 B2 * | 3/2006 | Fagrell .................. H05B 6/806 |
| | | 219/696 |
| 2004/0246079 A1 | 12/2004 | Ehata | |

FOREIGN PATENT DOCUMENTS

| JP | 56-096486 | 8/1981 |
| JP | 6-138204 | 5/1994 |

(Continued)

OTHER PUBLICATIONS

Extended European Search Report dated Mar. 1, 2021 in corresponding European Patent Application No. 18913858.9.
(Continued)

*Primary Examiner* — Quang T Van
(74) *Attorney, Agent, or Firm* — Wenderoth, Lind & Ponack, L.L.P.

(57) ABSTRACT

A dielectric constant estimation device which can estimate a dielectric constant of an object with high accuracy in a non-contact state even when a shape of the object is indefinite, and a microwave heating device equipped with the dielectric constant estimation device. The dielectric constant estimation device includes a transmitting antenna and a receiving antenna which can switch a polarized wave of an electromagnetic wave between a TE wave and a TM wave. Based on a reflected wave of the TE wave and a reflected wave of the TM wave from the object, the dielectric constant estimation device calculates a TM/TE reflection ratio, and compares the calculated TM/TE reflection ratio and dielectric constant data of theoretical values stored in a memory (Continued)

(a)

(b)

part in advance in the form of database with each other so that a dielectric constant of the object is estimated.

15 Claims, 7 Drawing Sheets

(58) Field of Classification Search
CPC .......... H05B 6/705; H05B 6/72; Y02B 40/00; A61K 31/52; A61K 31/5377; A61K 45/06; A61K 47/36; A61K 47/44; A61K 47/46; A61K 9/0007; A61K 9/0031; A61K 9/02; A61K 9/146; A61K 9/148; A61K 9/19; A61P 7/06; B01J 2208/00646; C01B 21/28; C01C 1/185; C07D 473/16; C07D 473/18
USPC ....... 219/679, 690, 694, 696, 702, 745, 746, 219/747, 748, 749, 750, 751, 761; 422/21, 105
See application file for complete search history.

(56) References Cited

FOREIGN PATENT DOCUMENTS

| JP | 2000-193608 | 7/2000 |
|---|---|---|
| JP | 2000-266693 | 9/2000 |
| JP | 2001-304573 | 10/2001 |
| JP | 2004-77348 | 3/2004 |
| JP | 2005-62152 | 3/2005 |
| JP | 2006-226847 | 8/2006 |
| JP | 2010-230466 | 10/2010 |
| JP | 2016-109612 | 6/2016 |

OTHER PUBLICATIONS

International Search Report dated Jul. 3, 2018 in International (PCT) Application No. PCT/JP2018/014729 with English translation.

"Introduction of Electric Wave Absorbing Material", written by Osamu Hashimoto, published by Morikita Publishing Co., Ltd., Oct. 1997, pp. 84 to 86, with English translation.

"Measurement of Complex Relative Dielectric Constant of Radar Dome Material in 60GHz Band", written by Osamu Hashimoto, published by The Institute of Electronics, Information and Communication Engineers, Oct. 1997, B-II vol. J80-B-II No. 10, pp. 909 to 911, with English translation.

International Preliminary Report on Patentability and Written Opinion of the International Searching Authority dated Oct. 15, 2020 in International (PCT) Application No. PCT/JP2018/014729, with English translation.

Office Action dated Jan. 20, 2023 in corresponding Chinese Patent Application No. 201880091967.1, with English translation of search report.

Changzhen et al., "Method of Metallurgical Physical Chemistry Research", Metallurgical Industry Publishing Company published on Apr. 30, 2013, with English translation of pp. 26-27.

* cited by examiner

*Fig.1*
(a)
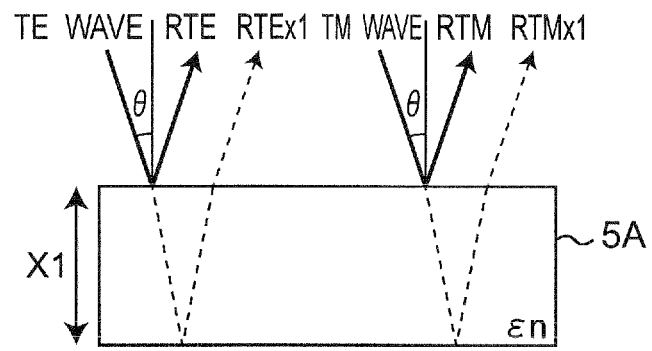
(b)
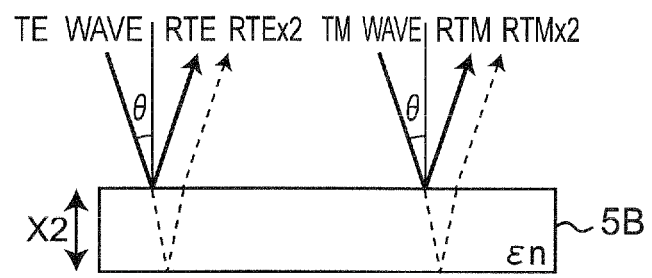

DIELECTRIC CONSTANT ESTIMATION DEVICE AND MICROWAVE HEATING APPARATUS PROVIDED WITH DIELECTRIC CONSTANT ESTIMATION DEVICE

TECHNICAL FIELD

The present invention relates to a dielectric constant estimation device which estimates a dielectric constant of an object in a state where the dielectric constant estimation device is not in contact with the object, and a microwave heating device which heats, by dielectric heating, an object to be heated which is an object using the dielectric constant estimation device.

BACKGROUND ART

Recently, as a microwave generation device, a microwave heating device equipped with a semiconductor element has been proposed in place of a magnetron used in general. A microwave generation device which uses a semiconductor element has following advantages. That is, the microwave generation device is small-sized, and can be manufactured at a low cost. Further, oscillation frequency of a microwave can be easily adjusted (for example, see Patent Literature 1).

In a microwave heating device equipped with such a microwave generation device, an oscillation frequency of a microwave emitted to the inside of a heating chamber in a predetermined frequency band is swept and, at the same time, reflection power from the heating chamber is detected, and an oscillation frequency of a microwave when the detected reflection power indicates a minimum value is stored. Then, the microwave having the stored oscillation frequency is emitted from an antenna in the heating chamber so that an electromagnetic field distribution is formed in the heating chamber whereby an object which is an object to be heated in the heating chamber is heated by dielectric heating.

CITATION LIST

Patent Literature

[Patent Literature 1] JP-A No. 56-96486

Non-Patent Literature

[Non-Patent Literature 1] Introduction of electric wave absorbing material written by Osamu Hashimoto, published by Morikita Publishing Co., Ltd., October 1997, pages 84 to 86

[Non-patent Literature 2] Measurement of complex relative dielectric constant of radar dome material in 60 GHz band, written by Osamu Hashimoto, published by The Institute of Electronics, Information and Communication Engineers, October 1997, B-II vol. J80-B-II No. 10, pages 909 to 911

SUMMARY OF INVENTION

Technical Problem

An electromagnetic field distribution in a heating chamber formed by a microwave heating device changes corresponding to a dielectric constant of an object in the heating chamber. Accordingly, in a case where a dielectric constant of an object is known in advance and a change in temperature of the dielectric constant of the object by heating is not known in advance, an electromagnetic field distribution optimum for the object in the heating chamber cannot be formed constantly thus giving rise to a drawback that efficient heating treatment of the object without any irregularities in heating cannot be performed.

Further, as a method of measuring a dielectric constant of an object in a non-contact state, there has been known an oscillation resonator method and a free space method. However, these methods have a drawback that unless a shape (such as a thickness size) of the object is known in advance, a dielectric constant of the object cannot be obtained.

The present invention has been made to overcome the above-mentioned drawbacks, and it is an object of the present invention to provide a dielectric constant estimation device which can estimate a dielectric constant of an object with high accuracy even when a size of the object is not known, and a microwave heating device which can perform efficient heating treatment of the object without any irregularities in heating by estimating the dielectric constant of the object.

Solution to Problems

To overcome the above-mentioned conventional drawbacks, according to an aspect of the present invention, there is provided a dielectric constant estimation device which includes: a transmitting antenna configured to emit an electromagnetic wave at a predetermined antenna angle with respect to an object; a transmitting antenna control part configured to switch a polarized wave of the electromagnetic wave emitted from the transmitting antenna to a TE wave or a TM wave; a dielectric constant estimating oscillation part configured to output a high frequency signal which forms the electromagnetic wave emitted from the transmitting antenna; a receiving antenna configured to receive a reflected wave of the electromagnetic wave reflected from the object with a predetermined antenna angle; a receiving antenna control part configured to switch a polarized wave of the electromagnetic wave received by the receiving antenna to a TE wave or a TM wave; an arithmetic operation part configured to calculate a TM/TE reflection ratio based on respective reflected waves of the TE wave and the TM wave from the object received by the receiving antenna; a memory part configured to store in advance theoretical value data indicating a relationship between the antenna angle and the TM/TE reflection ratio relating to a plurality of substances which differ from each other in a dielectric constant as a database; and a control part configured to output a control signal for performing a switching control for switching to a TE wave or a TM wave in the transmitting antenna and the receiving antenna, and an angle control of an antenna angle of the transmitting antenna and an antenna angle of the receiving antenna to the transmitting antenna control part and the receiving antenna control part, wherein the control part is configured to estimate a dielectric constant of the object by comparing the TM/TE reflection ratio calculated by the arithmetic operation part with the data of the theoretical value in the database stored in the memory part.

According to another aspect of the present invention, there is provided a microwave heating device which includes: a heating chamber for storing an object to be heated; a microwave oscillation part configured to generate a microwave for heating the object to be heated by dielectric heating; a microwave emission part configured to emit a microwave generated by the microwave oscillation part to the inside of the heating chamber through a microwave guide; a transmitting antenna configured to emit an electromagnetic wave at a predetermined antenna angle with respect to the object to be heated; a transmitting antenna control part configured to switch a polarized wave of the electromagnetic wave emitted from the transmitting antenna to a TE wave or a TM wave; a dielectric constant estimating oscillation part configured to output a high frequency signal which forms the electromagnetic wave emitted from the transmitting antenna; a receiving antenna configured to receive a reflected wave of the electromagnetic wave reflected from the object to be heated with a predetermined antenna angle; a receiving antenna control part configured to switch a polarized wave of the electromagnetic wave received by the receiving antenna to a TE wave or a TM wave; an arithmetic operation part configured to calculate a TM/TE reflection ratio based on respective reflected waves of the TE wave and the TM wave from the object to be heated received by the receiving antenna; a memory part configured to store in advance theoretical value data indicating a relationship between the antenna angle and the TM/TE reflection ratio relating to a plurality of substances which differ from each other in a dielectric constant as a database; and a control part configured to output a control signal for performing a switching control for switching to a TE wave or a TM wave in the transmitting antenna and the receiving antenna, an angle control of an antenna angle of the transmitting antenna and an antenna angle of the receiving antenna, and a frequency control of a microwave generated by the microwave oscillation part to the transmitting antenna control part, the receiving antenna control part, and the microwave oscillation part, wherein the control part is configured to estimate a dielectric constant of the object to be heated by comparing the TM/TE reflection ratio calculated by the arithmetic operation part with the data of the theoretical value in the database stored in the memory part, and the control part is configured to perform the frequency control of the microwave generated by the microwave oscillation part based on an estimated dielectric constant of the object to be heated.

Advantageous Effects of Invention

According to the present invention, the microwave heating device includes: the antennas which can switch a polarized wave of a microwave between a TE wave and a TM wave; and a unit which calculates a reflected wave of the TE wave and a reflected wave of the TM wave from an object. Accordingly, it is possible to provide a dielectric constant estimation device where a dielectric constant of the object can be estimated with high accuracy in a non-contact state even when a shape of the object is indefinite. Further, according to the present invention, it is possible to provide a microwave heating device where a dielectric constant of an object to be heated which is an object is estimated in a non-contact state even when a shape of the object to be heated is indefinite so that heating treatment of the object to be heated can be performed efficiently without any irregularities in heating.

BRIEF DESCRIPTION OF DRAWINGS (a) of FIG. 1 is an explanatory view showing respective reflected waves of a TE wave and a TM wave when a dielectric constant of an object to be measured which is an object of a dielectric constant estimation device according to an embodiment 1 of the present invention is $\varepsilon n$, and a thickness of the object to be measured is X1.

(b) of FIG. 1 is an explanatory view showing respective reflected waves of a TE wave and a TM wave when a dielectric constant of an object to be measured which is an object of the dielectric constant estimation device is $\varepsilon n$, and a thickness of the object to be measured is X2.

(a) of FIG. 2 is a characteristic graph, in the case of a TE wave, showing a simulation result relating to an incident angle (antenna angle) of an electromagnetic wave on the object to be measured and a reflection coefficient in the dielectric constant estimation device according to the embodiment 1 of the present invention.

(b) of FIG. 2 is a characteristic graph, in the case of a TM wave, showing a simulation result relating to an incident angle (antenna angle) of an electromagnetic wave on the object to be measured and a reflection coefficient in the dielectric constant estimation device.

(c) of FIG. 2 is a characteristic graph showing a result of calculating a TM/TE reflection ratio based on a result of the reflection coefficient of the TE wave and a result of the reflection coefficient of the TM wave in the dielectric constant estimation device.

Figure 5:
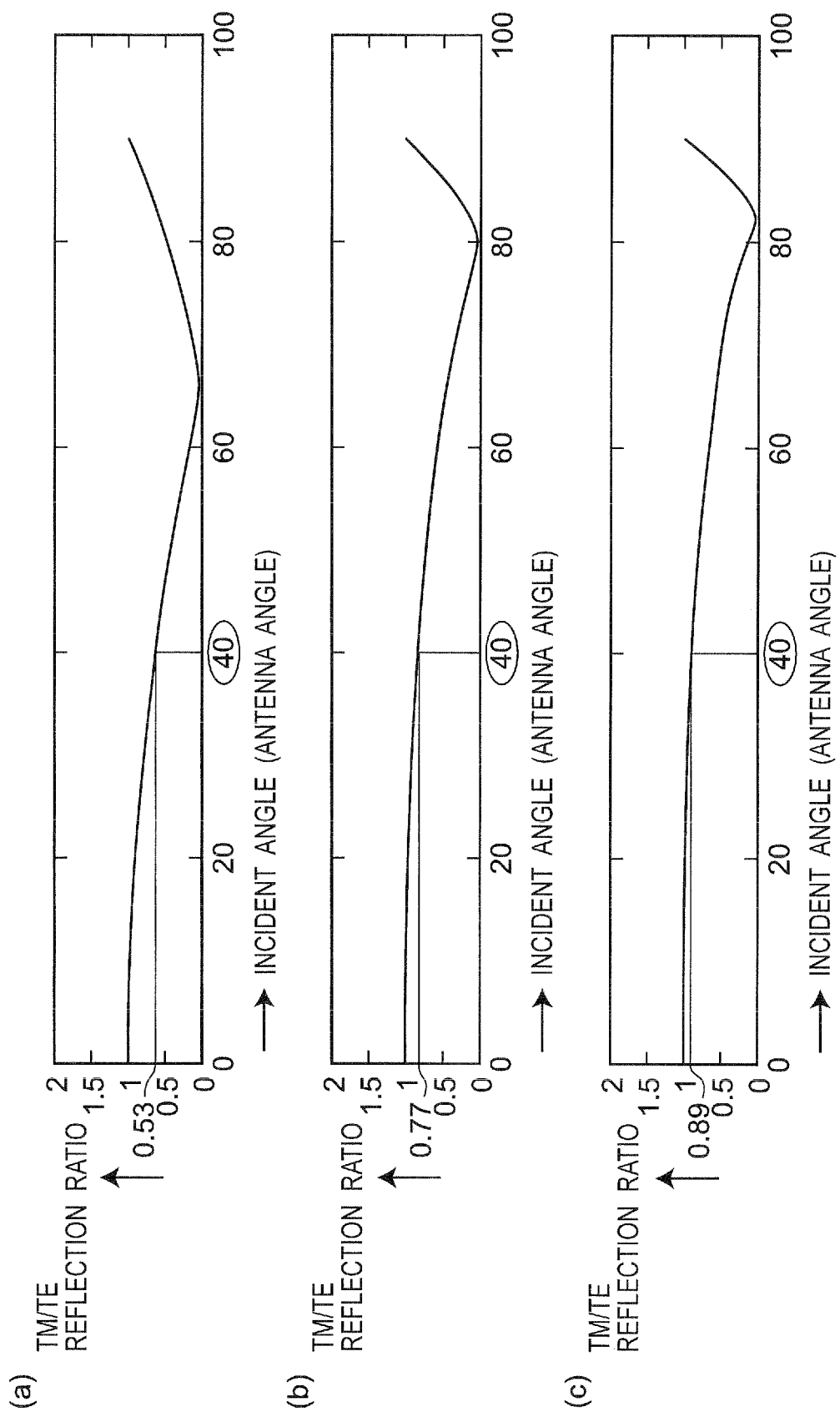

(a) of FIG. 5 is a characteristic graph showing a relationship between an antenna angle and a TM/TE reflection ratio with respect to a substance having a dielectric constant of "5".

(b) of FIG. 5 is a characteristic graph showing a relationship between an antenna angle and a TM/TE reflection ratio with respect to a substance having a dielectric constant of "30".

(c) of FIG. 5 is a characteristic graph showing a relationship between an antenna angle and a TM/TE reflection ratio with respect to a substance having a dielectric constant of "60".

Figure 6:
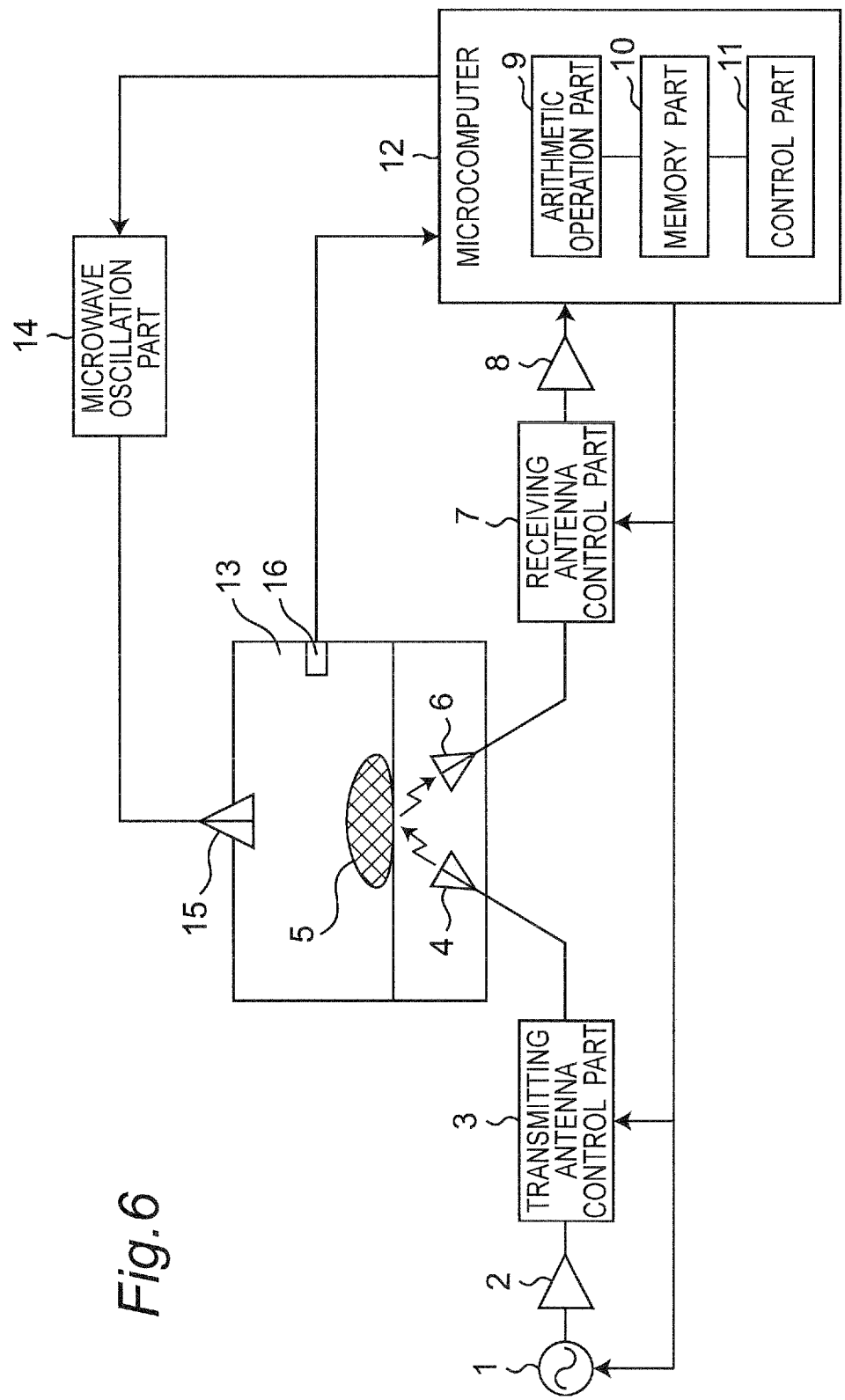

FIG. 6 is a block diagram showing a schematic configuration of a microwave heating device according to an embodiment 2 of the present invention.

Figure 7:
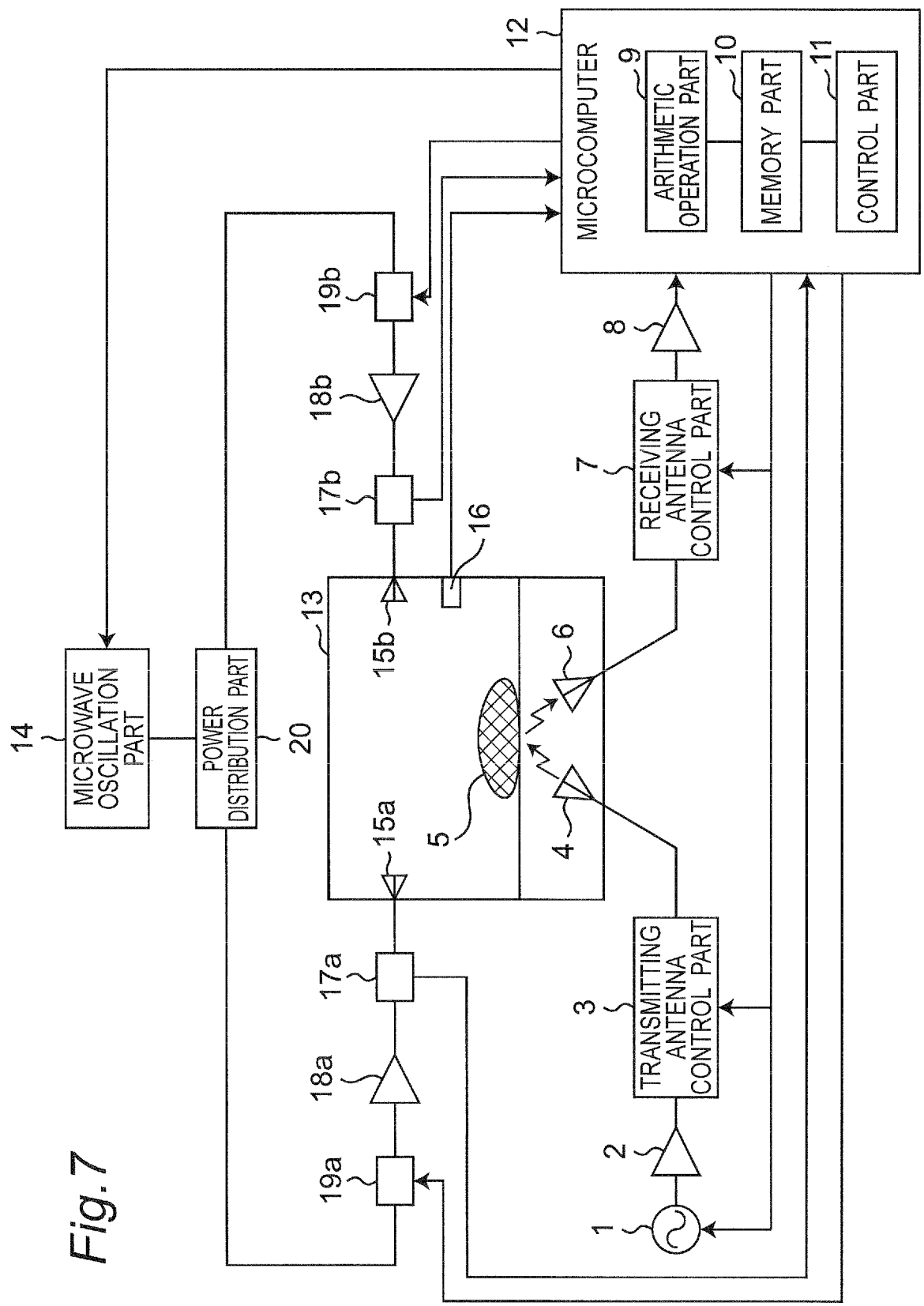

FIG. 7 is a block diagram showing a schematic configuration of a microwave heating device according to an embodiment 3 of the present invention.

DESCRIPTION OF EMBODIMENTS

Firstly, various configurations of a dielectric constant estimation device and a microwave heating device according to the present invention are described.

The dielectric constant estimation device according to a first aspect of the present invention may include: a transmitting antenna configured to emit an electromagnetic wave at a predetermined antenna angle with respect to an object; a transmitting antenna control part configured to switch a polarized wave of the electromagnetic wave emitted from the transmitting antenna to a TE wave or a TM wave; a dielectric constant estimating oscillation part configured to output a high frequency signal which forms the electromagnetic wave emitted from the transmitting antenna; a receiving antenna configured to receive a reflected wave of the electromagnetic wave reflected from the object at a predetermined antenna angle; a receiving antenna control part configured to switch a polarized wave of the electromagnetic wave received by the receiving antenna to a TE wave or a TM wave; an arithmetic operation part configured to calculate a TM/TE reflection ratio based on respective reflected waves of the TE wave and the TM wave from the object received by the receiving antenna; a memory part configured to store in advance theoretical value data indicating a relationship between the antenna angle and the TM/TE reflection ratio relating to a plurality of substances which differ from each other in a dielectric constant as a database; and a control part configured to output a control signal for performing a switching control for switching to a TE wave or a TM wave in the transmitting antenna and the receiving antenna, and an angle control of an antenna angle of the transmitting antenna and an antenna angle of the receiving antenna to the transmitting antenna control part and the receiving antenna control part, wherein the control part is configured to estimate a dielectric constant of the object by comparing the TM/TE reflection ratio calculated by the arithmetic operation part with the data of the theoretical value in the database stored in the memory part.

In the dielectric constant estimation device according to the first aspect having the above-mentioned configuration, even when a shape of the object, particularly a thickness of the object is indefinite, dielectric constant of the object can be estimated with high accuracy in a non-contact state.

The dielectric constant estimation device according to a second aspect of the present invention may be configured such that the control part according to the first aspect, in the angle control of the transmitting antenna and the receiving antenna, performs a switching control for switching a polarized wave of an electromagnetic wave to a TE wave or a TM wave at a plurality of antenna angles, and the arithmetic operation part calculates a TM/TE reflection ratio based on respective reflected waves of a TE wave and a TM wave from an object which the receiving antenna receives at the respective antenna angles.

The dielectric constant estimation device according to a third aspect of the present invention may be configured such that in the angle control of the transmitting antenna and the receiving antenna according to the first aspect, the respective antenna angles exhibit the same angle with respect to a perpendicular of a measurement reference surface on a surface of an object.

The dielectric constant estimation device according to a fourth aspect of the present invention may be configured such that the receiving antenna according to the first aspect has a half value angle which is wider than a half value angle of the transmitting antenna.

The dielectric constant estimation device according to a fifth aspect of the present invention may be configured such that the control part according to the first aspect controls a sum of the antenna angle of the transmitting antenna and the antenna angle of the receiving antenna within a range of 180 degrees.

The dielectric constant estimation device according to a sixth aspect of the present invention may be configured such that the control part according to the first aspect sets the antenna angle of the transmitting antenna and the antenna angle of the receiving antenna within a range of from 30 degrees to 40 degrees with respect to a perpendicular of a measurement reference surface on a surface of an object.

A microwave heating device according to a seventh aspect of the present invention may be configured to include: a heating chamber for storing an object to be heated; a microwave oscillation part configured to generate a microwave for heating the object to be heated by dielectric heating; a microwave emission part configured to emit a microwave generated by the microwave oscillation part to the inside of the heating chamber through a microwave guide; a transmitting antenna configured to emit an electromagnetic wave at a predetermined antenna angle with respect to the object to be heated; a transmitting antenna control part configured to switch a polarized wave of the electromagnetic wave emitted from the transmitting antenna to a TE wave or a TM wave; a dielectric constant estimating oscillation part configured to output a high frequency signal which forms the electromagnetic wave emitted from the transmitting antenna; a receiving antenna configured to receive a reflected wave of the electromagnetic wave reflected from the object to be heated with a predetermined antenna angle; a receiving antenna control part configured to switch a polarized wave of the electromagnetic wave received by the receiving antenna to a TE wave or a TM wave; an arithmetic operation part configured to calculate a TM/TE reflection ratio based on respective reflected waves of the TE wave and the TM wave from the object to be heated received by the receiving antenna; a memory part configured to store in advance theoretical value data indicating a relationship between the antenna angle and the TM/TE reflection ratio relating to a plurality of substances which differ from each other in a dielectric constant as a database; and a control part configured to output a control signal for performing a switching control for switching to a TE wave or a TM wave in the transmitting antenna and the receiving antenna, an angle control of an antenna angle of the transmitting antenna and an antenna angle of the receiving antenna, and a frequency control of a microwave generated by the microwave oscillation part to the transmitting antenna control part, the receiving antenna control part, and the microwave oscillation part, wherein the control part may be configured to estimate a dielectric constant of the object to be heated by comparing the TM/TE reflection ratio calculated by the arithmetic operation part with the data of the theoretical value in the database stored in the memory part, and the control part is configured to perform the frequency control of the microwave generated by the microwave oscillation part based on an estimated dielectric constant of the object to be heated.

In the microwave heating device according to the seventh aspect having the above-mentioned configuration, even when a shape of an object to be heated which is the object, particularly a thickness of the object to be heated is indefinite, dielectric constant of the object to be heated can be estimated with high accuracy in a non-contact state. Further, in the microwave heating device according to the seventh aspect, proper heating cooking can be performed in a heating pattern which corresponds to the detected dielectric constant. Further, even when the dielectric constant of the object to be heated changes in the course of heating, by controlling the heating pattern to a heating pattern which corresponds to a dielectric constant at a point of time in the course of heating, proper heating cooking of the object to be heated can be performed without any irregularities in heating.

The microwave heating device according to an eighth aspect of the present invention may be configured such that the microwave emission part according to the seventh aspect is formed of at least a pair of microwave emission parts which are disposed at positions in the heating chamber where the microwave emission parts opposedly face each other, and emits a microwave of the same frequency, and a phase of the microwave emitted from the pair of microwave emission parts is varied by phase varying parts disposed in the respective microwave guides disposed between the microwave oscillation part and the pair of microwave emission parts based on the estimated dielectric constant of the object to be heated.

The microwave heating device according to a ninth aspect of the present invention may be configured such that a reflection power detection part is disposed in the microwave guide disposed between the microwave oscillation part and the microwave emission part according to the seventh aspect, and the control part performs a control based on the estimated dielectric constant of the object to be heated such that reflection power which is detected by the reflection power detection part and returns to the microwave emission part from the heating chamber becomes minimal.

The microwave heating device according to a tenth aspect of the present invention may be configured such that, in the seventh aspect, the microwave heating device further includes a temperature sensor which is disposed in the heating chamber and detects a temperature in the heating chamber, and the control part calibrates the estimated dielectric constant of the object to be heated based on temperature information from the temperature sensor.

The microwave heating device according to a eleventh aspect of the present invention may be configured such that the control part according to the seventh aspect, in the angle control of the transmitting antenna and the receiving antenna, performs a switching control for switching a polarized wave of an electromagnetic wave to a TE wave or a TM wave at a plurality of antenna angles, and the arithmetic operation part calculates a TM/TE reflection ratio based on respective reflected waves of a TE wave and a TM wave from an object to be heated which the receiving antenna receives at the respective antenna angles.

The microwave heating device according to a twelfth aspect of the present invention may be configured such that in the angle control of the transmitting antenna and the receiving antenna according to the seventh aspect, the respective antenna angles exhibit the same angle with respect to a perpendicular of a measurement reference surface on a surface of an object to be heated.

The microwave heating device according to a thirteenth aspect of the present invention may be configured such that the receiving antenna according to the seventh aspect has a half value angle which is wider than a half value angle of the transmitting antenna.

The microwave heating device according to a fourteenth aspect of the present invention may be configured such that the control part according to the seventh aspect controls a sum of the antenna angle of the transmitting antenna and the antenna angle of the receiving antenna within a range of 180 degrees.

Hereinafter, a dielectric constant estimation device and a microwave heating device equipped with the dielectric constant estimation device according to an embodiment of the present invention are described with reference to drawings. In this embodiment, a dielectric constant estimation device and a microwave heating device equipped with the dielectric constant estimation device are described as specific examples respectively. However, the present invention is not limited to the configuration of the embodiment described hereinafter. The present invention includes various devices which execute dielectric constant estimation processing described in the embodiment.

Embodiment 1

FIG. 1 is a view for describing an operating principle of a dielectric constant estimation device according to an embodiment 1 of the present invention. First, a method of discriminating a dielectric using a microwave is described with reference to FIG. 1.

FIG. 1 is a view schematically showing respective reflected waves when a TE wave (transverse electric wave) and a TM wave (transverse magnetic wave) which are polarized waves of an electromagnetic wave are irradiated to objects to be measured (5A/5B) having the same dielectric constant (εn) but having different thicknesses (X1/X2).

(a) of FIG. 1 schematically shows a state of reflected waves when the TE wave and the TM wave which are the polarized waves of the electromagnetic wave are irradiated to an object to be measured 5A having a dielectric constant of "εn" and a thickness of "X1". (b) of FIG. 1 shows a state of reflected waves when the TE wave and the TM wave which are the polarized waves of the electromagnetic wave are irradiated to an object to be measured 5B having a dielectric constant of "εn" and a thickness of "X2" (X1>X2).

As shown in (a) of FIG. 1, when the TE wave is irradiated to the object to be measured 5A, a reflected wave RTE and a reflected wave $RTE_{x1}$ are generated on a front surface of the object to be measured 5A. The reflected wave RTE is generated in such a manner that the TE wave is reflected on a boundary surface on the front surface of the object to be measured 5A. The reflected wave $RTE_{x1}$ is generated in such a manner that the TE wave passes through the inside of the object to be measured 5A and is reflected on a boundary surface on a back surface of the object to be measured 5A and, then, appears on the front surface of the object to be measured 5A. These two reflected waves RTE, $RTE_{x1}$ are synthesized and a synthesized wave is emitted in the irradiation direction from the front surface of the object to be measured 5A. In the same manner, when the TM wave is irradiated to the object to be measured 5A, a reflected wave RTM and a reflected wave $RTM_{x1}$ are generated on the front surface of the object to be measured 5A. The reflected wave RTM is generated in such a manner that the TM wave is reflected on the boundary surface on the front surface of the object to be measured 5A. The reflected wave $RTM_{x1}$ is generated in such a manner that the TM wave passes through the inside of the object to be measured 5A and is reflected on the boundary surface on the back surface of the object to be measured 5A and, then, appears on the front surface of the object to be measured 5A. These two reflected waves RTM, $RTM_{x1}$ are synthesized and a synthesized wave is emitted in the irradiation direction from the front surface of the object to be measured 5A.

Also in the object to be measured 5B shown in (b) of FIG. 1, when the TE wave is irradiated to the object to be measured 5B, a reflected wave RTE and a reflected wave $RTE_{x2}$ are generated on a front surface of the object to be measured 5B. The reflected wave RTE is generated in such a manner that the TE wave is reflected on a boundary surface on the front surface of the object to be measured 5B. The reflected wave $RTE_{x2}$ is generated in such a manner that the TE wave passes through the inside of the object to be measured 5B and is reflected on a boundary surface on a back surface of the object to be measured 5B and, then, appears on the front surface of the object to be measured 5B. These two reflected waves RTE, $RTE_{x2}$ are synthesized and a synthesized wave is emitted in the irradiation direction from the front surface of the object to be measured 5B. In the same manner, when the TM wave is irradiated to the object to be measured 5B, a reflected wave RTM and a reflected wave $RTM_{x2}$ are generated on the front surface of the object to be measured 5B. The reflected wave RTM is generated in such a manner that the TM wave is reflected on the boundary surface on the front surface of the object to be measured 5B. The reflected wave $RTM_{x2}$ is generated in such a manner that the TM wave passes through the inside of the object to be measured 5B and is reflected on the boundary surface on the back surface of the object to be measured 5B and, then, appears on the front surface of the object to be measured 5B. These two reflected waves RTM, $RTM_{x2}$ are synthesized and a synthesized wave is emitted in the irradiation direction from the front surface of the object to be measured 5B.

In this embodiment, assume that the TE wave and the TM wave are totally reflected without passing through the boundary surface on the back surface of the object to be measured 5A, 5B.

The reflected wave RTE in (a) of FIG. 1 and the reflected wave RTE in (b) of FIG. 1 are the same. However, the reflected wave $RTE_{x1}$ in (a) of FIG. 1 and the reflected wave $RTE_{x2}$ in (b) of FIG. 1 are not the same because a thickness X1 of the object to be measured 5A and a thickness X2 of the object to be measured 5B differ, that is, the object to be measured 5A and the object to be measured 5B differ in transmission distance. In the same manner, in FIG. 1, the reflected wave RTM in (a) and the reflected wave RTM in (b) are the same. However, the reflected wave $RTM_{x1}$ in (a) of FIG. 1 and the reflected wave $RTM_{x2}$ in (b) of FIG. 1 are not the same because the thickness X1 of the object to be measured 5A and the thickness X2 of the object to be measured 5B differ, that is, the object to be measured 5A and the object to be measured 5B differ in transmission distance.

The reflected wave generated when a TE wave is irradiated to the object to be measured 5A, 5B becomes a synthesized wave of the reflected waves RTE, $RTE_{x1}$ in the object to be measured 5A (see (a) of FIG. 1), and becomes a synthesized wave of reflected waves RTE, $RTE_{x2}$ in the object to be measured 5B (see (b) of FIG. 1). However, the reflected wave $RTE_{x1}$ and the reflected wave $RTE_{x2}$ are not equal and hence, the synthesized wave formed of the reflected waves RTE, $RTE_{x1}$ on the front surface of the object to be measured 5A and the synthesized wave of the reflected waves RTE, $RTE_{x2}$ on the front surface of the object to be measured 5B are not equal. That is, even when the same TE wave is irradiated to the objects to be measured 5A, 5B respectively, reflected waves emitted from the objects to be measured 5A, 5B vary corresponding to thicknesses of the objects to be measured 5A, 5B.

In the same manner, the reflected wave generated when a TM wave is irradiated to the object to be measured 5A, 5B becomes a synthesized wave of reflected waves RTM, $RTM_{x1}$ in the object to be measured 5A (see (a) of FIG. 1), and becomes a synthesized wave of reflected waves RTM, $RTM_{x2}$ in the object to be measured 5B (see (b) of FIG. 1). However, the reflected wave $RTM_{x1}$ and the reflected wave $RTM_{x2}$ are not equal and hence, the synthesized wave of the reflected waves RTM, $RTM_{x1}$ on the front surface of the object to be measured 5A and the synthesized wave of the reflected waves RTM, $RTM_{x2}$ on the front surface of the object to be measured 5B are not equal. That is, even when the same TM wave is irradiated to the objects to be measured 5A, 5B respectively, reflected waves emitted from the objects to be measured 5A, 5B vary corresponding to thicknesses of the objects to be measured 5A, 5B.

Next, the relationship between a reflected wave from an object to be measured and a dielectric constant of the object to be measured is described. In general, it is known that the following formula 1 is established in the relationship between a reflectance and a dielectric constant when a microwave propagates a boundary surface between regions having different dielectric constants.

[Formula 1]

$$\Gamma = \frac{1 - \frac{\sqrt{\varepsilon 2}}{\sqrt{\varepsilon 1}}}{1 + \frac{\sqrt{\varepsilon 2}}{\sqrt{\varepsilon 1}}} \quad (1)$$

In formula 1, $\Gamma$ indicates a reflection coefficient. The reflection coefficient $\Gamma$ means a reflectance of a microwave reflected on a boundary surface due to the difference in dielectric constant when the microwave propagates from a region having a dielectric constant $\varepsilon 1$ to a region having a dielectric constant $\varepsilon 2$. With the use of formula 1, if a microwave can be irradiated to an object to be measured and only a reflected wave from a boundary surface on a front surface of the object to be measured at a point of time of radiation can be measured, a dielectric constant of the object to be measured can be estimated. However, the object to be measured has a certain thickness so that the object to be measured also has a boundary surface on a back surface and hence, a reflected wave from the boundary surface on the back surface is also emitted from the front surface of the object to be measured. As a result, with respect to a reflected wave emitted from the front surface, such a reflected wave varies when a thickness of an object to be measured changes. Accordingly, unless a thickness of the object to be measured is known, a dielectric constant cannot be estimated.

The present invention provides a dielectric constant estimation device which can solve a problem that a dielectric constant of the object to be measured cannot be estimated in a non-contact state when a thickness of an object to be measured which is an object is not known, and applies such a dielectric constant estimation device to various equipments.

Hereinafter, dielectric constant estimation processing and the dielectric constant estimation device are described with reference to FIG. 1. Reflection characteristics (reflection coefficients $\Gamma$) of reflected waves relating to a TE wave and a TM wave which are polarized waves of an electromagnetic wave respectively vary depending on an incident angle ($\theta$) of the electromagnetic wave on the object to be measured (see Non-Patent Literature 2), and it is known that the following formula 2 is established.

[Formula 2]

$$\Gamma = \frac{1 - \exp(-j2\delta)}{1 - R'^2 \exp(-j2\delta)} R' \quad (2)$$

In formula 2, R' is expressed by the following formula 3 in the case of a TE wave, and R' is expressed by the following formula 4 in the case of a TM wave. Further, $\delta$ in formula 2 is expressed by the following formula 5.

[Formula 3]

$$R' = \frac{\sqrt{1 - \sin^2\theta} - \sqrt{\varepsilon - \sin^2\theta}}{\sqrt{1 - \sin^2\theta} + \sqrt{\varepsilon - \sin^2\theta}} \quad (3)$$

[Formula 4]

$$R' = \frac{\varepsilon\sqrt{1-\sin^2\theta} - \sqrt{\varepsilon-\sin^2\theta}}{\varepsilon\sqrt{1-\sin^2\theta} + \sqrt{\varepsilon-\sin^2\theta}} \quad (4)$$

[Formula 5]

$$\delta = 2\pi d/\lambda \cdot \sqrt{\varepsilon-\sin^2\theta} \quad (5)$$

In formula 3, formula 4 and formula 5, λ indicates a wave length of a microwave, ε indicates a dielectric constant of an object to be measured, d indicates a thickness of the object to be measured, and θ indicates an incident angle of an electromagnetic wave on the object to be measured. The TE wave and the TM wave have different reflection characteristics. However, provided that the TE wave and the TM wave have the same transmission distance in the inside of the object to be measured, transmission energies of the TE wave and the TM wave attenuate in the same manner. Accordingly, it is considered that a TM/TE reflection ratio which is a ratio between a reflection characteristic of the TE wave and a reflection characteristic of the TM wave does not change. In view of the above, it is estimated that the following formula 6 is established.

[Formula 6]

$$\frac{RTM + RTM \times 1}{RTE + RTE \times 1} = \frac{RTM + RTM \times 2}{RTS + RTE \times 2} = A\varepsilon n \quad (6)$$

Formula 6 expresses a TM/TE reflection ratio: (RTM+RTM$_{x1}$)/(RTE+RTE$_{x1}$) which is a reflection ratio between a reflected wave (RTM+RTM$_{x1}$) of the TM wave and a reflected wave (RTE+RTE$_{x1}$) of the TE wave from the object to be measured 5A having the thickness X1 in (a) and (b) of FIG. 1. Formula 6 indicates a TM/TE reflection ratio: (RTM+RTM$_{x2}$)/(RTE+RTE$_{x2}$) which is a reflection ratio between a reflected wave (RTM+RTM$_{x2}$) of a TM wave and a reflected wave (RTE+RTE$_{x2}$) of a TE wave on the object to be measured 5B having a thickness X2. These TM/TE reflection ratios take a fixed value Aεn. In formula 6, A indicates a constant, and εn is a dielectric constant of the objects to be measured 5A, 5B. From the above, it is understood that even when objects to be measured have different thicknesses, a TM/TE reflection ratio relating to a TE wave and a TM wave takes a fixed value, and can be decided as a value proportional to a dielectric constant of the object to be measured. A numerator and a denominator may be reversed in the above-mentioned TM/TE reflection ratio.

Figure 2:
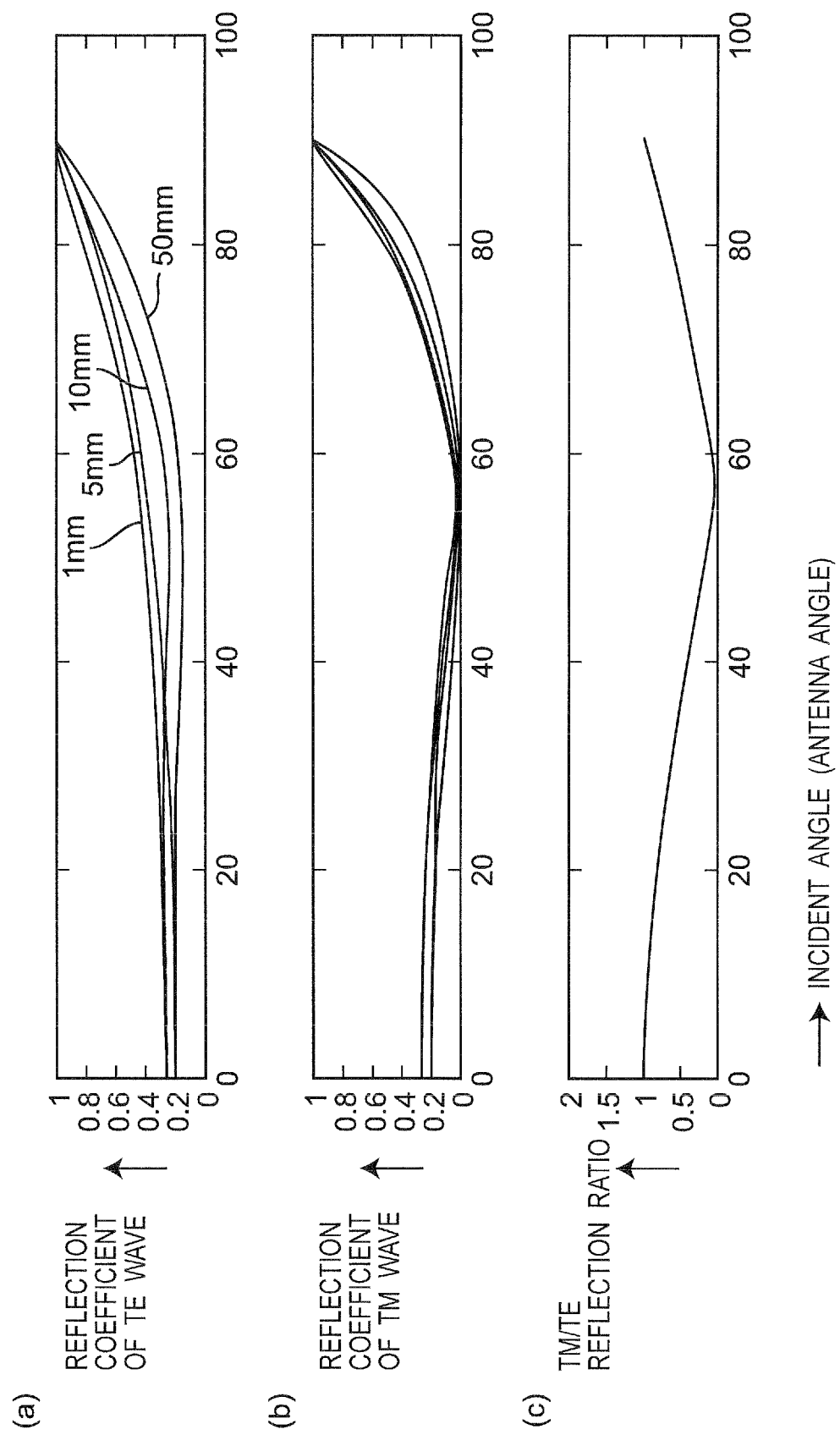

FIG. 2 is a characteristic graph showing a simulation result obtained using a numerical analysis software (Matlab made by Mathworks). FIG. 2 theoretically proves the estimation of the above-mentioned formula 6.

In a simulation where the characteristic graphs in FIG. 2 are calculated, as one example of an object to be measured which is an object, four kinds of polyethylene where thickness is 1 mm, 5 mm, 10 mm or 50 mm are used. In polyethylene, a real part of a dielectric constant is 2.26, and an imaginary part of a dielectric constant is 0.0009. The characteristic graphs in FIG. 2 show the results (theoretical values) obtained by calculation using formula 2, formula 3, formula 4 and formula 5 assuming that a frequency of an electromagnetic wave irradiated to these objects to be measured is 24 GHz.

(a) of FIG. 2 shows a calculation result of a reflection coefficient Γ in the case of a TE wave. In (a) of FIG. 2, a reflection coefficient Γ is taken on an axis of ordinates, and an incident angle θ of an electromagnetic wave on an object to be measured is taken on an axis of abscissas. In this embodiment, the incident angle θ of "0" means that an electromagnetic wave is incident perpendicular to a front surface of the object to be measured. As shown in (a) of FIG. 2, it is understood that, depending on a difference in thickness between the objects to be measured, a reflection coefficient Γ of a TE wave changes at respective incident angles θ. Characteristic curves shown in (a) of FIG. 2 respectively indicate cases where the objects to be measured have thicknesses of 1 mm, 5 mm, 10 mm or 50 mm in order from the top.

(b) of FIG. 2 shows a calculation result of a reflection coefficient Γ in the case of a TM wave. In (b) of FIG. 2, in the same manner as (a) of FIG. 2, a reflection coefficient Γ is taken on an axis of ordinates, and an incident angle θ of an electromagnetic wave on an object to be measured is taken on an axis of abscissas. As shown in (b) of FIG. 2, it can be understood that, depending on a difference in thickness between the objects to be measured, a reflection coefficient Γ of a TM wave changes at the respective incident angles θ.

(c) of FIG. 2 shows a result obtained by calculating a TM/TE reflection ratio based on a result of the reflection coefficient Γ of a TE wave and a result of the reflection coefficient Γ of a TM wave. As shown in (c) of FIG. 2, even when objects to be measured have different thicknesses, a TM/TE reflection ratio takes a fixed value at any incident angle θ. Accordingly, the result shows that the above-mentioned estimation is theoretically correct.

[Dielectric Constant Estimation Device]

Figure 3:
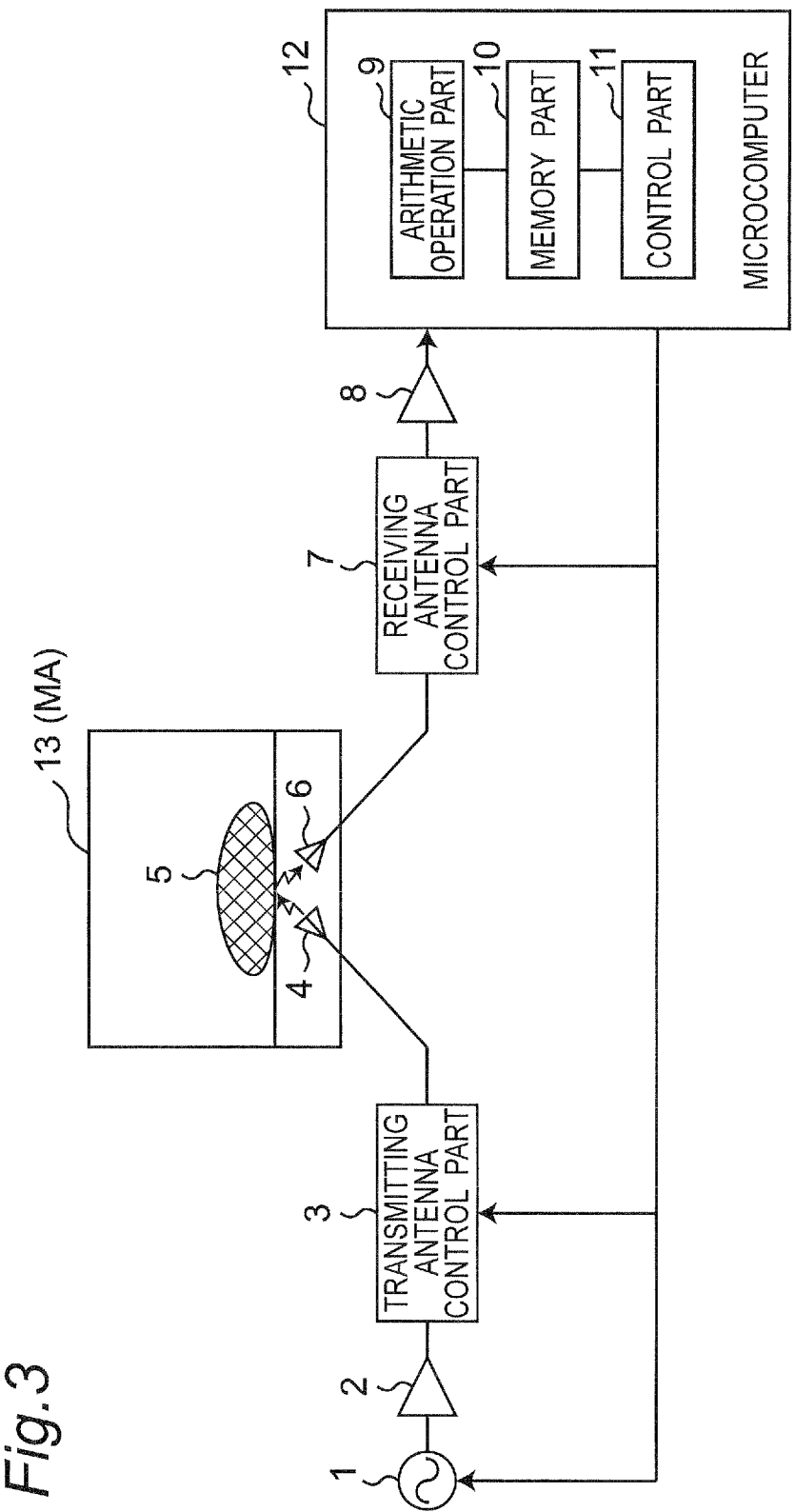
FIG. 3 is a block diagram showing a schematic configuration of the dielectric constant estimation device according to the embodiment 1 of the present invention.

FIG. 3 is a block diagram showing a schematic configuration of a dielectric constant estimation device according to the embodiment 1 of the present invention. As shown in FIG. 1, control signals from a control part 11 described later are inputted in the dielectric constant estimating oscillation part 1, and the dielectric constant estimating oscillation part 1 outputs a predetermined high frequency signal. The high frequency signal outputted from the dielectric constant estimating oscillation part 1 is amplified by a transmission amplifier 2 and, thereafter, is emitted from a transmitting antenna 4 through a transmitting antenna control part 3 as an electromagnetic wave. The electromagnetic wave emitted from the transmitting antenna 4 is emitted toward the object to be measured 5 which is an object to be stored in a storing part 13 which forms a measurement region MA. Then, the electromagnetic wave reflected on the object to be measured 5 is received by a receiving antenna 6. The electromagnetic wave received by the receiving antenna 6 is outputted to the reception amplifier 8 through a receiving antenna control part 7 and is amplified by the reception amplifier 8 and, thereafter, is outputted to the microcomputer 12. The microcomputer 12 performs a control of a system which estimates a dielectric constant of the object to be measured 5.

The transmitting antenna 4 and the receiving antenna 6 are disposed directly below a bottom surface of the storing part 13 forming the measurement region MA at predetermined antenna angles (incident angle/receiving angle) such that the transmitting antenna 4 and the receiving antenna 6 can transmit and receive an electromagnetic wave. The dielectric constant estimation device of the embodiment 1 is configured such that the object to be measured 5 is placed on the bottom surface of the storing part 13. Accordingly, the bottom surface of the storing part 13 is made of a material which allows an electromagnetic wave to pass therethrough.

The microcomputer 12 includes an arithmetic operation part 9, a memory part 10 and a control part 11. The arithmetic operation part 9 calculates a reflected wave received from the object to be measured 5, and the calculation result is stored in the memory part 10. The control part 11 outputs, to the transmitting antenna control part 3 and the receiving antenna control part 7, a control signal for performing a switching control which switches a polarized wave of an electromagnetic wave to be emitted between a TE wave and a TM wave, and a control signal for performing an angle control which controls antenna angles (transmitting angle/incident angle) of the transmitting antenna 4 and an antenna angle (receiving angle) of the receiving antenna 6. In the transmitting antenna control part 3 and the receiving antenna control part 7 into which control signals from the control part 11 are inputted, the switching control is performed where a polarized wave of an electromagnetic wave to be emitted from the transmitting antenna 4 and the receiving antenna 6 is switched to a TE wave or a TM wave and, at the same time, the angle control is performed where an incident angle (transmitting angle) of an electromagnetic wave on the object to be measured 5 and a receiving angle of a reflected wave are adjusted.

To be more specific, for example, the transmitting antenna control part 3 performs a switching control and an angle control such that a polarized wave of an electromagnetic wave to be emitted from the transmitting antenna 4 is switched to a TE wave, and an incident angle of the electromagnetic wave on the object to be measured 5 takes an angle of (+) 20 degrees with respect to the direction perpendicular to a front surface (measurement reference surface) of the object to be measured 5. Further, the receiving antenna control part 7 performs a switching control and an angle control such that a polarized wave to be received by the receiving antenna 6 is switched to a TE wave, and a receiving angle of an electromagnetic wave from the object to be measured 5 takes an angle of (−) 20 degrees with respect to the direction perpendicular to a front surface (measurement reference surface) of the object to be measured 5. That is, an incident angle of an electromagnetic wave from the transmitting antenna 4 on the object to be measured 5 and the receiving angle at which the receiving antenna 6 receives an electromagnetic wave are set to the same angle on both sides of a perpendicular of the front surface (measurement reference surface) of the object to be measured 5. The above-mentioned incident angle and receiving angle are described as "antenna angles" in the description made hereinafter.

In the state set as described above, in response to a high frequency signal outputted from the dielectric constant estimating oscillation part 1, a TE wave which is a polarized wave of an electromagnetic wave is emitted to the object to be measured 5 from the transmitting antenna 4. The electromagnetic wave emitted to the object to be measured 5 is reflected on the front surface of the object to be measured 5, and the reflected wave is received by the receiving antenna 6. The reflected wave received by the receiving antenna 6 is inputted to the microcomputer 12, and is stored in the memory part 10 as a reflected wave where a polarized wave is a TE wave and a receiving angle (antenna angle) is 20 degrees.

Next, in response to a control signal from the control part 11, the transmitting antenna control part 3 switches a polarized wave of an electromagnetic wave to be emitted from the transmitting antenna 4 to a TM wave. Further, in response to a control signal from the control part 11, the receiving antenna control part 7 switches a polarized wave of an electromagnetic wave to be received by the receiving antenna 6 to a TM wave. In a state set as described above, in response to a high frequency signal outputted from the dielectric constant estimating oscillation part 1, a TM wave which is a polarized wave of an electromagnetic wave is emitted to the object to be measured 5 from the transmitting antenna 4. The electromagnetic wave emitted to the object to be measured 5 is reflected on the front surface of the object to be measured 5, and the reflected wave is received by the receiving antenna 6. The reflected wave received by the receiving antenna 6 is inputted to the microcomputer 12, and is stored in the memory part 10 as a reflected wave where a polarized wave is a TM wave, and a receiving angle (antenna angle) is 20 degrees.

As described above, based on the result of the reflected wave of the TE wave and the result of the reflected wave of the TM wave which are stored in the memory part 10, the arithmetic operation part 9 calculates a TM/TE reflection ratio at an antenna angle of 20 degrees, and the calculation result is stored in the memory part 10.

The case where the antenna angle is 20 degrees has been described heretofore. However, in dielectric constant estimation processing described later, reflected waves of TE waves and reflected waves of TM waves may be respectively received at a plurality of respective antenna angles (for example, 10 degrees, 20 degrees, 30 degrees, 40 degrees and 50 degrees), and TM/TE reflection ratios at the respective antenna angles may be calculated and, then, these calculation results may be stored in the memory part 10. Dielectric constant estimation processing where a TM/TE reflection ratio is calculated as described above is further described with reference to a flowchart shown in FIG. 4 described later.

In the transmitting antenna 4 and the receiving antenna 6, a switching system which performs switching of a polarized wave of an electromagnetic wave between a TE wave and a TM wave may be realized by mechanically rotating the transmitting/receiving antennas per se by 90 degrees. Alternatively, the switching system may be realized by the configuration where different antenna electrodes which are rotated from each other by 90 degrees are provided to the antennas per se in advance, and the respective antenna electrodes are electrically switched. The switching system adopted by the transmitting antenna 4 and the receiving antenna 6 can be easily realized by a simple configuration.

[Dielectric Constant Estimation Processing]

Figure 4:
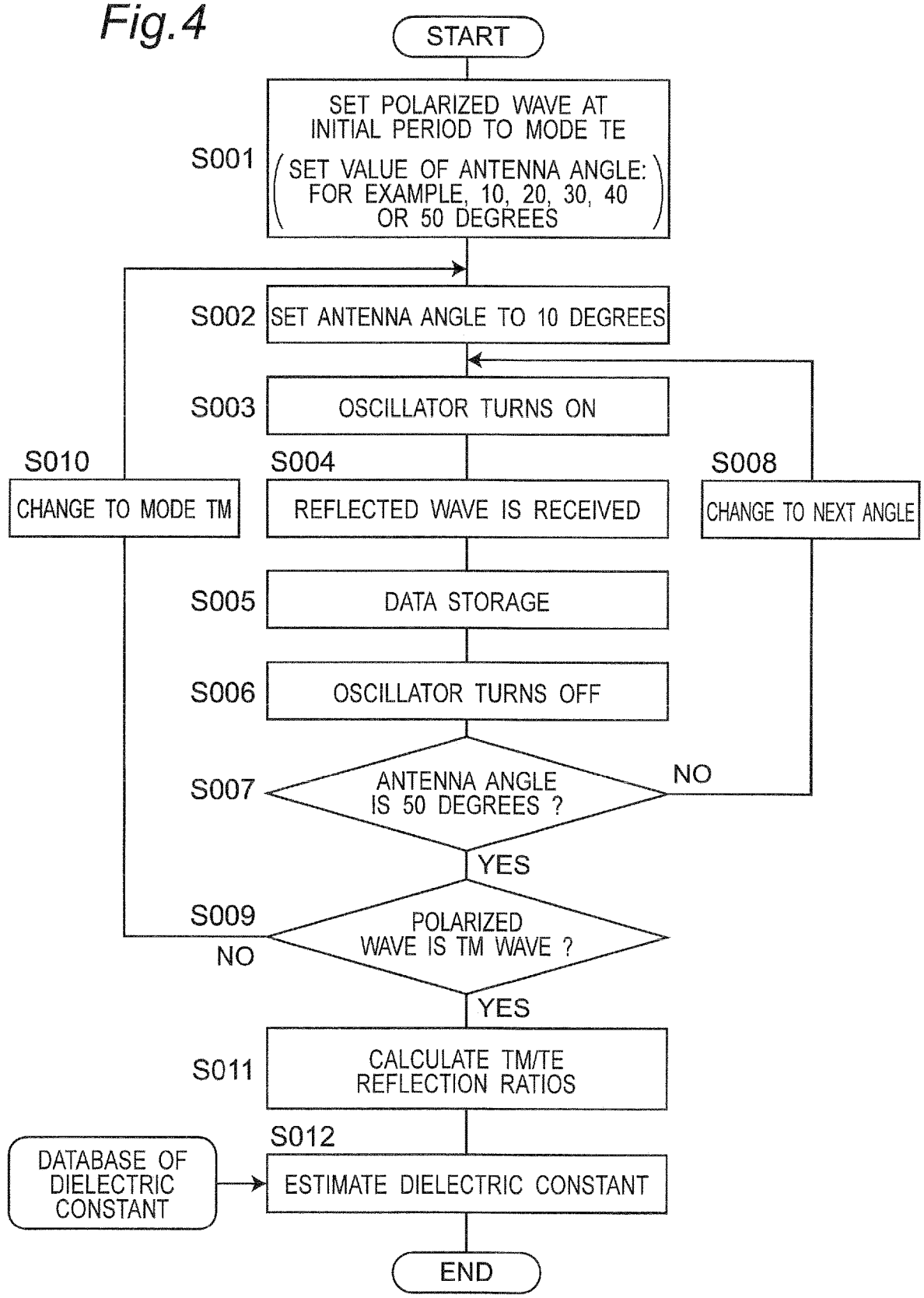
FIG. 4 is a flowchart showing dielectric constant estimation processing executed by the dielectric constant estimation device according to the embodiment 1 of the present invention.

Next, with reference to a flowchart shown in FIG. 4 which indicate dielectric constant estimation processing, the dielectric constant estimation processing executed by the dielectric constant estimation device of the embodiment 1 is described using specific numerical value examples. In this embodiment, the description is made by taking specific numerical value examples (10 degrees, 20 degrees, 30 degrees, 40 degrees, and 50 degrees) as an incident angle. However, these numerical value examples do not limit the present invention.

In step S001 of the flowchart shown in FIG. 4, the control part 11 of the microcomputer 12 outputs a control signal to the transmitting antenna control part 3 such that the transmitting antenna control part 3 makes the transmitting antenna 4 transmit a TE wave as a polarized wave of an electromagnetic wave at an initial period. The transmitting antenna control part 3 which receives the control signal sets the transmitting antenna 4 such that the transmitting antenna 4 transmits a TE wave. On the other hand, the control part 11 outputs a control signal to the receiving antenna control part 7 such that the receiving antenna control part 7 makes the receiving antenna 6 receive a TE wave. The receiving antenna control part 7 which receives the control signal sets the receiving antenna 6 such that the receiving antenna 6 receives a TE wave.

In step S002, the control part 11 of the microcomputer 12 outputs a control signal which is a control command to the transmitting antenna control part 3 and the receiving antenna control part 7 such that the transmitting antenna control part 3 and the receiving antenna control part 7 set antenna angles of the transmitting antenna 4 and the receiving antenna 6 to 10 degrees which is an initial set value. As the antenna angle of the transmitting antenna 4/the receiving antenna 6 in the embodiment 1, angles of 10 degrees, 20 degrees, 30 degrees, 40 degrees and 50 degrees with respect to a perpendicular of the measurement reference surface on the front surface of the object to be measured 5 are used. That is, the antenna angle of 0 degrees is an angle at which the antenna is perpendicular to the front surface of the object to be measured 5 (measurement reference surface). In dielectric constant estimation processing shown in flowchart in FIG. 4, antenna angles are set in the control part 11 in advance such that reflected waves of a TE wave and a TM wave are sequentially measured at a plurality of antenna angles.

In step S003, the control part 11 of the microcomputer 12 starts (turns on) the dielectric constant estimating oscillation part 1, and makes the dielectric constant estimating oscillation part 1 output a high frequency signal.

In step S004, an electromagnetic wave reflected on the object to be measured 5 is received by the receiving antenna 6, and propagates to the microcomputer 12 through the reception amplifier 8.

In step S005, the received electromagnetic wave is recorded in the memory part 10 as a TE wave at an antenna angle at this point of time, for example, 10 degrees.

In step S006, the control part 11 stops (turns off) an oscillation operation of the dielectric constant estimating oscillation part 1 thus stopping an output of a high frequency signal.

In step S007, whether or not a set antenna angle is a maximum value, for example, whether or not a set antenna angle is 50 degrees is determined. When the antenna angle is not the maximum value, in step S008, the antenna angle is changed to a next set value of the antenna angle, for example, is changed to 20 degrees succeeding to 10 degrees, and the processing advances to step S003. When the antenna angle is the maximum value, the processing advances to step S009.

In step S009, whether or not a polarized wave transmitted and received by the transmitting antenna 4 and the receiving antenna 6 is set to a TM wave is determined. When the polarized wave transmitted and received by the transmitting antenna 4 and the receiving antenna 6 is not set to a TM wave, the processing advances to step S010.

In step S010, setting of a polarized wave transmitted and received by the transmitting antenna 4 and receiving antenna 6 is changed to a TM wave, and the processing returns to step S002. In step S002, the flow is continued where an antenna angle is set to an initial value (for example, 10 degrees), a reflected wave is received, and a reflected wave is measured.

In step S009, when a polarized wave to be transmitted and received by the transmitting antenna 4 and the receiving antenna 6 is already set to a TM wave, it is assumed that the measurement of reflected waves of the TE wave and the TM wave which are polarized waves at respective antenna angles is completed, and the processing advances to step S011.

In step S011, data recorded in the memory part 10 is read out by the control part 11 of the microcomputer 12, and the arithmetic operation part 9 calculates respective TM/TE reflection ratios (measured values) relating to a TE wave and a TM wave at antenna angles of 10 degrees, 20 degrees, 30 degrees, 40 degrees and 50 degrees respectively.

In the memory part 10, data on theoretical values (dielectric constant data) which is calculated with respect to dielectric constant, antenna angles and TM/TE reflection ratios recorded in advance is stored in the form of database. In step S012, the above-mentioned data on theoretical values (dielectric constant data) recorded in the memory part 10 in advance is read out from the database. Accordingly, in step S012, the control part 11 compares calculated TM/TE reflection ratios (measured values) at the respective antenna angles with respect to the object to be measured 5 with data on theoretical values (dielectric constant data) in the database, and the control part 11 estimates a dielectric constant of the object to be measured 5. With such operations, dielectric constant estimation processing is finished.

[Data on Theoretical Value (Dielectric Constant Data)]

Next, a method of forming dielectric constant data which is data on theoretical values where a relationship between dielectric constants, antenna angles and calculation results of TM/TE reflection ratios is formed into database is described with reference to FIG. 5. FIG. 5 shows dielectric constant data showing the relationship between an antenna angle and a TM/TE reflection ratio relating to substances (three kinds of substances) respectively having known dielectric constants.

(a) of FIG. 5 is a characteristic graph showing a relationship based on an antenna angle and a calculation result (theoretical value) of a TM/TE reflection ratio with respect to a substance where a value of a dielectric constant is "5". By inputting "5" as a value of a dielectric constant, a value of an incident angle and an arbitrary value of a thickness in the above-mentioned formula 2, formula 3, formula 4 and formula 5, reflection coefficients Γ of a TE wave and a TM wave are calculated. With the calculation of TM/TE reflection ratios (theoretical values) based on the calculation results of the reflection coefficients Γ, results shown in the characteristic graph in (a) of FIG. 5 can be easily acquired.

(b) and (c) of FIG. 5 are characteristic graphs formed based on results acquired by performing calculation in the same manner. (b) of FIG. 5 is a characteristic graph showing a relationship based on an antenna angle and a calculation result (a theoretical value) of a TM/TE reflection ratio with respect to a substance where a value of a dielectric constant is "30". (c) of FIG. 5 is a characteristic graph showing a relationship based on an antenna angle and a calculation results (a theoretical value) of a TM/TE reflection ratio with respect to a substance where a value of a dielectric constant is "60".

As described above, the relationships between antenna angles and TM/TE reflection ratios with respect to various substances having different dielectric constants are calculated in advance when necessary, and the calculation results (theoretical values) are stored in the memory part 10 in the form of database.

Accordingly, in estimating a dielectric constant of the object to be measured 5, for example, assuming a case where an antenna angle is set to 40 degrees, by comparing a result of calculation of a TM/TE reflection ratio calculated based on an actually-measured TM wave and an actually-measured TE wave (measured value) with a theoretical value of a TM/TE reflection ratio recorded in the memory part 10 in advance as dielectric constant data, a dielectric constant of the object to be measured 5 can be easily estimated.

For example, assume a case where a TM/TE reflection ratio is calculated based on actually measured reflected waves when an antenna angle is set to 40 degrees with respect to the object to be measured 5 and the result of the calculation (measured value) is 0.53. In such a case, the measured value of 0.53 is equal to a value of a TM/TE reflection ratio at an antenna angle of 40 degrees in a characteristic graph shown in (a) of FIG. 5 showing a characteristic of a substance where a dielectric constant is "5". If the object to be measured 5 has the same TM/TE reflection ratio as the substance shown in (a) of FIG. 5 also at other antenna angles, it is estimated that the object to be measured 5 has the same dielectric constant ("5") as the substance shown in (a) of FIG. 5.

In the same manner, assume a case where a TM/TE reflection ratio is calculated based on actually measured reflected waves when an antenna angle is set to 40 degrees and the result of the measurement (measured value) is 0.77. In such a case, the measured value of 0.77 is equal to a value of a TM/TE reflection ratio in the characteristic graph shown in (b) of FIG. 5. Accordingly, if the object to be measured 5 has the characteristic as the substance shown in (b) of FIG. 5 also at other antenna angles, it is estimated that the object to be measured 5 has the same dielectric constant ("30") as the substance shown in (b) of FIG. 5.

Further, assume a case where a TM/TE reflection ratio is calculated based on actually measured reflected waves when an antenna angle is set to 40 degrees and the result of the measurement (measured value) is 0.89. In such a case, the measured value of 0.89 is equal to a value of a TM/TE reflection ratio in the characteristic graph shown in (c) of FIG. 5. Accordingly, if the object to be measured 5 has the same characteristic as the substance shown in (c) of FIG. 5 also at other antenna angles, it is estimated that the object to be measured 5 has the same dielectric constant ("60") as the substance shown in (c) of FIG. 5.

As described above, in the dielectric constant estimation processing of the embodiment 1, the antenna angles (incident angle/receiving angle) are changed, and a TE wave and a TM wave of an electromagnetic wave are irradiated to the object to be measured 5, reflected waves from the object to be measured 5 are received, and a measured value of a TM/TE reflection ratio is acquired based on the received reflected waves. Then, the acquired measured value of the TM/TE reflection ratio and dielectric constant data which is formed in advance in the form of database are compared with each other. Accordingly, a dielectric constant of the object to be measured 5 can be estimated with high accuracy. As described above, with the use of dielectric constant estimation processing of the embodiment 1, it is possible to provide a dielectric constant estimation device which can estimate a dielectric constant of the object to be measured 5 with high accuracy even when a shape (thickness) of the object to be measured 5 is indefinite.

In the dielectric constant estimation processing and the dielectric constant estimation device according to the embodiment 1, the configuration is adopted where TM/TE reflection ratios are measured while changing an antenna angle with respect to the object to be measured 5 to a plurality of angles. However, when an optimum antenna angle for estimating a dielectric constant of the object to be measured 5 is known in advance, the configuration may be adopted where the antenna angle is fixed to such an optimum antenna angle.

Further, in the above-mentioned embodiment, an antenna angle of the transmitting antenna 4 and an antenna angle of the receiving antenna 6 are set to the same (±) angle on both sides of a perpendicular of the measurement reference surface. However, depending on a shape of the object to be measured 5, it is not necessary to set the antenna angle of the transmitting antenna 4 and the antenna angle of the receiving antenna 6 to the same angle. The configuration may be adopted where an antenna angle of the transmitting antenna 4 is fixed, and a scanning operation is performed by changing an antenna angle of the receiving antenna 6. By allowing the receiving antenna 6 to perform a scanning operation in this manner, an optimum reception sensitivity is detected so that measurement accuracy may be enhanced.

The object to be measured 5 is not limited to a food, and any object may be used as the object to be measured 5 provided that the object is formed using a substance having a dielectric constant. Further, the combination of the transmitting antenna 4 and the receiving antenna 6 is not limited to one pair of the transmitting antenna 4 and the receiving antenna 6. By providing the plurality of pairs of the transmitting antenna 4 and the receiving antenna 6, a dielectric constant of the object to be measured 5 can be two-dimensionally and three-dimensionally detected so that detection accuracy of a dielectric constant can be enhanced.

In the flowchart shown in FIG. 4 in the embodiment 1, the configuration is adopted where a dielectric constant of the object to be measured 5 is detected at different antenna angles which vary every 10 degrees. However, detection accuracy can be further enhanced by performing a scanning operation within a certain angle range.

In the dielectric constant estimation processing and the dielectric constant estimation device according to the embodiment 1, the description has been made with respect to the example where an electromagnetic wave is irradiated to the front surface of the object to be measured 5 at one point. However, by transmitting or receiving an electromagnetic wave to the surface of the object to be measured 5 at a plurality of points or by transmitting or receiving an electromagnetic wave at an angle optimum for a shape of the front surface of the object to be measured 5, even when the object to be measured 5 has a complicated front surface, a dielectric constant can be measured with high accuracy.

In the dielectric constant estimation device according to the embodiment 1, a receiving antenna 6 may be used where a half value angle of the receiving antenna 6 is wider than a half value angle of the transmitting antenna 4. With the use of such a receiving antenna 6 having a wider half value angle, a reflected wave generated by diffuse reflection on the object to be measured 5 can be also measured.

Embodiment 2

FIG. 6 is a block diagram showing a schematic configuration of a microwave heating device according to an embodiment 2 of the present invention. The microwave heating device shown in FIG. 6 includes the dielectric constant estimation device of the above-mentioned embodiment 1. In the description of the embodiment 2, elements having functions, configurations and the manners of operation substantially identical to the corresponding elements described in the above-mentioned embodiment 1 are given the same symbols, and the description of such elements may be omitted so as to avoid the repeated description.

The microwave heating device of the embodiment 2 shown in FIG. 6 is a heating cooker represented by a microwave oven, and includes a heating chamber 13 forming a storing part (measurement region MA) of the dielectric constant estimation device in a device body. A microwave oscillation part 14 formed using a semiconductor element generates a desired microwave (for example, 2.4 GHz to 2.5 GHz) in response to a control signal from a control part 11. A microwave heating antenna (microwave emission part) 15 is adjacently disposed directly below a bottom surface of the heating chamber 13, and a microwave from the microwave oscillation part 14 propagates to the microwave heating antenna 15. A microwave is irradiated to the object to be heated which is a food placed in the heating chamber 13 from the microwave heating antenna 15 so that the object to be heated is subjected to heating cooking.

The object to be heated which is subjected to heating cooking by the microwave heating device of the embodiment 2 corresponds to an object to be measured 5 which is an object to be measured by the above-mentioned dielectric constant estimation device as described later. Accordingly, in the description made hereinafter, the description is made by giving same symbol 5 to an object to be heated and an object to be measured.

The microwave heating device of the embodiment 2 includes the dielectric constant estimation device having the configuration described in the embodiment 1 with reference to FIG. 3. As shown in FIG. 6, the microwave heating device is provided with the dielectric constant estimation device which includes: a dielectric constant estimating oscillation part 1; a transmission amplifier 2; a transmitting antenna control part 3; a transmitting antenna 4; a receiving antenna 6; a receiving antenna control part 7; a reception amplifier 8; and a microcomputer 12.

The microwave heating device of the embodiment 2 is configured such that the microcomputer 12 performs a control of dielectric constant estimation processing for estimating a dielectric constant of the object to be measured 5 and executes a control for performing dielectric heating. The microwave heating device of the embodiment 2 includes a temperature sensor 16 for measuring a temperature in the heating chamber 13, a temperature of a front surface of the object to be heated 5 or the like. As the temperature sensor 16, configurations which adopt various temperature measurement methods such as a thermocouple, a thermistor, a resistance temperature detector, a semiconductor or an infrared sensor may be used.

In the microwave heating device of the embodiment 2, for physical property of each food which is the object to be heated 5, change rates of dielectric constant at different temperatures are recorded in advance in the memory part 10 as dielectric constant data. Accordingly, a calculation result (measured value) of a TM/TE reflection ratio calculated based on a measurement result of a reflected wave of a TE wave and a measurement result of a reflected wave of a TM wave is compared with dielectric constant data (theoretical value) recorded in advance. With such comparison, a dielectric constant of a food which is the object to be heated 5 can be estimated. Accordingly, the microwave heating device of the embodiment 2 can discriminate the food which is the object to be heated 5 based on the estimated dielectric constant and hence, accuracy in discriminating a food can be enhanced. Further, in the microwave heating device of the embodiment 2, a dielectric constant of a food which is the object to be heated 5 can be estimated and hence, based on a rate of change in dielectric constant caused by a temperature change of the food, the food can be identified with high accuracy and, at the same time, a cooking state of the food at a current point of time can be detected.

With respect to a dielectric constant of a specific food, for example, a dielectric constant of raw beef at 40 degrees Celsius is 45.2, and a dielectric constant of fish at 40 degrees Celsius is 45.0. In view of the above, it is difficult to discriminate beef and fish at 40 degrees Celsius from each other based on a dielectric constant. However, at 60 degrees Celsius, a dielectric constant of raw beef is 44.4, and a dielectric constant of fish is 43.8. In this case, a change rate of a dielectric constant of beef based on a change in temperature (from 40° C. to 60° C.) is 1.77% [=(45.2−44.4)/45.2]. A change rate of a dielectric constant of fish based on a change in temperature (from 40° C. to 60° C.) is 2.67% [=(45.0−43.8)/45.0]. Accordingly, based on a rate of change in dielectric constant caused by a temperature change (from 40° C. to 60° C.), beef and fish can be easily discriminated from each other. As described above, with the use of a change in dielectric constant at different temperatures, discrimination accuracy can be enhanced.

As described above, a food is discriminated and, subsequently, a change in dielectric constant is measured and hence, an inner temperature and a cooking state of the food can be estimated.

Further, a temperature difference between an inner temperature based on a dielectric constant of a food and a temperature detected by the temperature sensor 16 is detected. With such detection, accuracy in cooking the food can be enhanced.

Inventors of the present invention carried out an experiment for discriminating a food which is the object to be heated (object to be measured) 5 using the dielectric constant estimation device provided to the microwave heating device of the embodiment 2. As a food used in the discrimination experiment, a cake, chicken, and a carrot were used. In the discrimination experiment carried out with respect to these foods, based on a difference in dielectric constant between the objects to be measured 5, the foods could be surely discriminated from each other. Further, in a dielectric constant estimation experiment using a carrot as the object to be heated, the experiment was carried out in a state where each of cut carrots obtained by cutting the carrot into various shapes was placed on a vessel. In the discrimination experiment with respect to the carrot, it is confirmed that when an antenna angle is set to 30 degrees or 40 degrees with respect to a perpendicular of a placing surface on which the vessel is placed, irrespective of a shape of the cut carrot, a dielectric constant can be estimated with accuracy. Further, when the antenna angle with respect to the object to be heated (measuring object) 5 was set to a value which falls within a range of from 30 degrees to 40 degrees, a particularly favorable result could be acquired in estimating a dielectric constant. In the experiment, a placing surface (horizontal plane) of the heating chamber (storing part) 13 on which the object to be heated (object to be measured) 5 is placed was used as a measurement reference surface, and an incident angle and a receiving angle with respect to a perpendicular of the measurement reference surface were used as antenna angles.

With the use of the receiving antenna 6 having a half value angle wider than a half value angle of the transmitting antenna 4, it is also possible to measure reflected waves causing diffuse reflection due to a shape of the object to be heated (object to be measured) 5 at antenna angles other than 30 degrees or 40 degrees, for example. As a result, reflected waves at angles which are against Snell's law due to a shape of the object to be measured can be also widely received.

Accordingly, accuracy in estimating a dielectric constant of the object to be heated (object to be measured) 5 is enhanced so that discrimination accuracy can be further improved.

In the microwave heating device of the embodiment 2, at an initial stage of heating processing, reflected waves from the object to be heated 5 are measured in such a manner that an antenna angle at which an electromagnetic wave is irradiated from the transmitting antenna 4 to the object to be heated 5 is sequentially changed and, then, the electromagnetic wave is irradiated while being switched between a TE wave and a TM wave. Based on the measured reflected wave, the microwave heating device of the embodiment 2 calculates a TM/TE reflection ratio (measured value). As described above, in the microwave heating device of the embodiment 2, a TM/TE reflection ratio (measured value) is calculated based on reflected waves from the object to be heated 5 at respective antenna angles. Accordingly, even when a shape or a size (thickness) of the object to be heated 5 is indefinite, the microwave heating device of the embodiment 2 can estimate a dielectric constant of the object to be heated 5 with high accuracy. As a result, proper heating cooking can be performed with respect to the object to be heated 5.

The microwave heating device of the embodiment 2 can estimate a dielectric constant of the object to be heated 5 with high accuracy. Accordingly, heating cooking can be performed in a proper heating pattern which corresponds to the dielectric constant of the object to be heated 5. At the same time, when it is necessary to change a heating pattern due to a change in dielectric constant of the object to be heated 5 caused by heating, the heating pattern can be changed at a timing proper to the object to be heated 5. As a result, the microwave heating device of the embodiment 2 can perform heating cooking of the object to be heated 5 without any irregularities in heating with high efficiency.

Embodiment 3

FIG. 7 is a block diagram showing a schematic configuration of a microwave heating device which includes a dielectric constant estimation device according to an embodiment 3 of the present invention. In the description of the embodiment 3, elements having functions, configurations and the manners of operation substantially identical to the corresponding elements described in the above-mentioned embodiments 1 and 2 are given the same symbols, and the description of such elements may be omitted so as to avoid the repeated description.

The microwave heating device of the embodiment 3 shown in FIG. 7 is configured such that the microwave heating device includes the dielectric constant estimation device described in the embodiment 1, and also includes a plurality of microwave heating antennas (microwave emission part) 15 (15a, 15b) for heating, by dielectric heating, an object to be heated 5 which is placed in a heating chamber 13 which forms a storing part (measurement region MA). The microwave heating device of the embodiment 3 is described with respect to the configuration where two microwave emission parts 15 which form a pair are respectively provided to both side walls of the heating chamber 13 such that the microwave emission parts 15 opposedly face the side walls of the heating chamber 13. However, the present invention is not limited to such a configuration, and a plurality of pairs of microwave emission parts 15 may be provided to a bottom surface, ceiling or the like of the heating chamber 13.

As has been described in the above-mentioned embodiment 2, along with the increase in temperature of the object to be heated 5 caused by heating of the object to be heated 5, a dielectric constant of the object to be heated 5 changes. Inventors have confirmed from the experiment that when a dielectric constant of the object to be heated 5 changes, a heating point of a heating pattern formed by a microwave emitted in the heating chamber 13 is displaced. Accordingly, with the use of the microwave heating device of the embodiment 3, it is possible to provide the configuration where, during heating cooking, a change in dielectric constant of the object to be heated 5 is detected and, based on such a change in dielectric constant of the object to be heated 5, a heating pattern is controlled such that a proper heating point can be acquired.

As shown in FIG. 7, in the same manner as the above-mentioned microwave heating device of the embodiment 2, the microwave heating device of the embodiment 3 is provided with a dielectric constant estimation device which includes: a dielectric constant estimating oscillation part 1; a transmission amplifier 2; a transmitting antenna control part 3; a transmitting antenna 4; a receiving antenna 6; a receiving antenna control part 7; a reception amplifier 8; and a microcomputer 12. Accordingly, in the microwave heating device of the embodiment 3, before heating cooking is performed, dielectric constant estimation processing is executed with respect to the object to be heated 5 which is a food using the dielectric constant estimation device so that a dielectric constant of the object to be heated 5 is detected. Further, also during heating cooking, dielectric constant estimation processing is executed with respect to the object to be heated 5 which is a food, and a change in dielectric constant of the object to be heated 5 is detected.

As shown in FIG. 7, in the microwave heating device of the embodiment 3, two microwave emission parts 15a, 15b are provided to wall surfaces of the heating chamber 13 which are disposed on sides opposite to each other. In microwave transmission guides through which a microwave propagates to the microwave emission parts 15a, 15b, reflection power detection parts 17a, 17b, amplifiers 18a, 18b, phase varying parts 19a, 19b, a power distribution part 20, and a microwave oscillation part 14 formed using a semiconductor element are provided. The power distribution part 20 distributes an output from the microwave oscillation part 14 in two, and two microwave transmission guides are formed with starting from the power distribution part 20 to two microwave emission parts 15a, 15b. Each of the phase varying parts 19a, 19b provided to two microwave transmission guides respectively varies and adjusts a phase of a microwave propagating through the microwave transmission guide. In the microwave transmission guide, the reflection power detection part 17a, 17b is provided between the amplifier 18a, 18b and the microwave emission part 15a, 15b. The reflection power detection part 17a, 17b detects microwave reflection power which the microwave emission part 15a, 15b receives, and inversely guides the microwave reflection power from the microwave emission part 15a, 15b in the direction toward the amplifier 18a, 18b.

The microwave heating device of the embodiment 3 is configured such that, corresponding to microwave reflection power detected by the reflection power detection part 17a, 17b, an oscillation frequency of the microwave oscillation part 14 and a phase amount of the phase varying part 19a, 19b are controlled by the control part 11 of the microcomputer 12.

In the microwave heating device of the embodiment 3, frequency optimization processing is executed where the control part 11 controls the microwave oscillation part 14 and the phase varying part 19a, 19b such that an oscillation frequency at which microwave reflection power detected by the reflection power detection part 17a, 17b is minimized is set.

In the microwave heating device of the embodiment 3, the pair of microwave emission parts 15a, 15b are combined with each other such that the direction of an excitation field and the direction of an excitation magnetic field of one microwave emission part and the direction of an excitation field and the direction of an excitation magnetic field of the other microwave emission part are made to agree with each other. Accordingly, due to mutual interferences between the microwave emission parts, a microwave has a heating pattern having directivity (heating point) corresponding to a mutual phase difference, and such microwave is emitted to the heating chamber 13. "Having directivity (heating point)" means that the heating pattern has a specific region where positions at which microwaves emitted from the microwave emission parts 15a, 15b respectively become strong are made to overlap with each other. With the control of a phase difference of microwaves emitted from the microwave emission parts 15a, 15b, a position where a microwave becomes strong can be moved on and along a direction which connects the positions where the pair of microwave emission parts 15a, 15b are arranged. The microwaves emitted from the pair of microwave emission parts 15a, 15b have the same frequency.

In the microwave heating device of the embodiment 3 having the above-mentioned configuration, in the same manner as the above-mentioned embodiment 2, at the initial stage of heating processing, object-to-be-heated discrimination processing is executed where a TM/TE reflection ratio is calculated based on detected reflected waves at respective antenna angles, and a dielectric constant of the object to be heated 5 is estimated and, then, the object to be heated 5 is discriminated. Thereafter, heating cooking proper to the discriminated object to be heated 5 is executed.

The microwave heating device of the embodiment 3 is configured such that, even after the object to be heated 5 is discriminated, dielectric constant estimation processing is continuously executed and, based on a change in estimated dielectric constant of the object to be heated 5, a proper heating pattern is selected so that the object to be heated is heated by heating cooking without any irregularities in heating with high efficiency.

In dielectric constant estimation processing during heating cooking in the microwave heating device of the embodiment 3, unlike the above-mentioned dielectric constant estimation processing shown in FIG. 4, it is possible to specify that the object to be heated 5 is a food without calculating a TM/TE reflection ratio at a plurality of antenna angles. Accordingly, for example, it may be possible to perform processing where a TM/TE reflection ratio at one antenna angle, for example, 30 degrees or 40 degrees, is calculated, and a change in dielectric constant of the object to be heated 5 is detected so that an optimum heating pattern is selected.

In the microwave heating device of the embodiment 3, the control part 11 performs a control such that a sum of an antenna angle of the transmitting antenna 4 and an antenna angle of the receiving antenna 6 falls within a range of 180 degrees. Particularly, the control part 11 sets the antenna angle of the transmitting antenna 4 and the antenna angle of the receiving antenna 6 within a range of from 30 degrees to 40 degrees with respect to a perpendicular of the measurement reference surface on the front surface of the object to be heated 5. In such a case, in performing transmission and reception, a dielectric constant of the object to be heated 5 can be detected with high accuracy.

As has been described heretofore, the microwave heating device according to the present invention includes: the transmitting antenna and the receiving antenna which can switch a polarized wave of an electromagnetic wave between a TE wave and a TM wave; and the device which detects a reflected wave of the TE wave and a reflected wave of the TM wave from the object (object to be measured/object to be heated) and calculates a TM/TE reflection ratio based on a value of the detected reflected waves. Accordingly, a dielectric constant of an object can be estimated with high accuracy in a non-contact state. Further, in the microwave heating device equipped with the dielectric constant estimation processing/the dielectric constant estimation device of the present invention, a cooker can be realized where an object to be heated which is an object can be heated by heating cooking without any irregularities in heating with high efficiency.

In the present invention, the device equipped with the dielectric constant estimation processing/the dielectric constant estimation device is not limited to a microwave heating device. The device equipped with the dielectric constant estimation processing/the dielectric constant estimation device according to the present invention is not limited to applications where a dielectric constant of an object is estimated in a non-contact state and a kind of the object is discriminated. For example, the device equipped with the dielectric constant estimation processing/the dielectric constant estimation device according to the present invention is applicable to various applications such as estimation of freshness of an object or estimation of a moisture content of an object.

As a specific example, the present invention is applicable to systems such as: a system for monitoring freshness of a food and a decomposition state of a food in a refrigerator; a system for determining food quality based on a dielectric constant and a moisture content of a food in a food quality inspection performed by a food courier and food distributor; a system for detecting food freshness and food decomposition, for performing a food receiving inspection, and for detecting a foreign substance in a food in a supermarket or the like; and
a system where a difference in dielectric constant is detected so as to perform cancer screening safely at a low cost; a system where a moisture content of a skin is measured so as to estimate an age and to diagnose progress of aging; and a system for detecting a situation of a skin problem in a medical field.

The present invention has been described with reference to the respective embodiments in detail to some extent. However, the configuration disclosed in these embodiments may be changed with respect to details as a matter of course, and a change in combination or order of elements in the respective embodiments can be realized without departing from the scope and the spirit of Claims of the present invention.

The present invention has been sufficiently described in association with preferable embodiments with reference to attached drawings. However, it is apparent that various modifications and changes can be made by those who are skilled in the art. It should be construed that such modifications and changes fall within the scope of attached Claims without departing from the scope of the present invention.

INDUSTRIAL APPLICABILITY

According to the present invention, a dielectric constant of an object can be estimated with high accuracy in a non-contact state and hence, the present invention can be used in a wide range in various systems so that it is possible to form a device with extremely high convenience in society.

REFERENCE SIGNS LIST

1 Dielectric constant estimating oscillation part
2 Transmission amplifier
3 Transmitting antenna control part
4 Transmitting antenna
5 Object to be measured/object to be heated
6 Receiving antenna
7 Receiving antenna control part
8 Reception amplifier
9 Arithmetic operation part
10 Memory part
11 Control part
12 Microcomputer
13 Storing part/heating chamber
14 Microwave oscillation part
15 Antenna part for microwave heating (microwave emission part)
16 Temperature sensor
17a, 17b Reflection power detection part
18a, 18b Amplifier
19a, 19b Phase varying part
20 Power distribution part

The invention claimed is:

1. A dielectric constant estimation device comprising:
a transmitting antenna configured to emit an electromagnetic wave at a predetermined antenna angle with respect to an object;
a transmitting antenna control part configured to switch a polarized wave of the electromagnetic wave emitted from the transmitting antenna to a TE wave or a TM wave;
a dielectric constant estimating oscillation part configured to output a high frequency signal which forms the electromagnetic wave emitted from the transmitting antenna;
a receiving antenna configured to receive a reflected wave of the electromagnetic wave reflected from the object with a predetermined antenna angle;
a receiving antenna control part configured to switch a polarized wave of the electromagnetic wave received by the receiving antenna to a TE wave or a TM wave;
an arithmetic operation part configured to calculate a TM/TE reflection ratio based on respective reflected waves of the TE wave and the TM wave from the object received by the receiving antenna;
a memory part configured to store in advance theoretical value data indicating a relationship between the antenna angle and the TM/TE reflection ratio relating to a plurality of substances which differ from each other in a dielectric constant as a database; and
a control part configured to output a control signal for performing a switching control for switching to a TE wave or a TM wave in the transmitting antenna and the receiving antenna, and an angle control of an antenna angle of the transmitting antenna and an antenna angle of the receiving antenna to the transmitting antenna control part and the receiving antenna control part, wherein
the control part is configured to estimate a dielectric constant of the object by comparing the TM/TE reflection ratio calculated by the arithmetic operation part with the data of the theoretical value in the database stored in the memory part.

2. The dielectric constant estimation device according to claim 1, wherein
the control part is configured to, in the angle control of the transmitting antenna and the receiving antenna, perform a switching control for switching a polarized wave of an electromagnetic wave to a TE wave or a TM wave at a plurality of antenna angles, and the arithmetic operation part is configured to calculate a TM/TE reflection ratio based on respective reflected waves of a TE wave and a TM wave from an object which the receiving antenna receives at the respective antenna angles.

3. The dielectric constant estimation device according to claim 1, wherein
in the angle control of the transmitting antenna and the receiving antenna, the respective antenna angles exhibit the same angle with respect to a perpendicular of a measurement reference surface on a surface of an object.

4. The dielectric constant estimation device according to claim 1, wherein
the receiving antenna has a half value angle which is wider than a half value angle of the transmitting antenna.

5. The dielectric constant estimation device according to claim 1, wherein
the control part is configured to control a sum of the antenna angle of the transmitting antenna and the antenna angle of the receiving antenna within a range of 180 degrees.

6. The dielectric constant estimation device according to claim 1, wherein
the control part is configured to set the antenna angle of the transmitting antenna and the antenna angle of the receiving antenna within a range of from 30 degrees to 40 degrees with respect to a perpendicular of a measurement reference surface on a surface of an object.

7. A microwave heating device comprising:
a heating chamber for storing an object to be heated;
a microwave oscillation part configured to generate a microwave for heating the object to be heated by dielectric heating;
a microwave emission part configured to emit a microwave generated by the microwave oscillation part to the inside of the heating chamber through a microwave guide;
a transmitting antenna configured to emit an electromagnetic wave at a predetermined antenna angle with respect to the object to be heated;
a transmitting antenna control part configured to switch a polarized wave of the electromagnetic wave emitted from the transmitting antenna to a TE wave or a TM wave;
a dielectric constant estimating oscillation part configured to output a high frequency signal which forms the electromagnetic wave emitted from the transmitting antenna;
a receiving antenna configured to receive a reflected wave of the electromagnetic wave reflected from the object to be heated with a predetermined antenna angle;
a receiving antenna control part configured to switch a polarized wave of the electromagnetic wave received by the receiving antenna to a TE wave or a TM wave;

an arithmetic operation part configured to calculate a TM/TE reflection ratio based on respective reflected waves of the TE wave and the TM wave from the object to be heated received by the receiving antenna;

a memory part configured to store in advance theoretical value data indicating a relationship between the antenna angle and the TM/TE reflection ratio relating to a plurality of substances which differ from each other in a dielectric constant as a database; and a control part configured to output a control signal for performing a switching control for switching to a TE wave or a TM wave in the transmitting antenna and the receiving antenna, an angle control of an antenna angle of the transmitting antenna and an antenna angle of the receiving antenna, and a frequency control of a microwave generated by the microwave oscillation part to the transmitting antenna control part, the receiving antenna control part, and the microwave oscillation part, wherein the control part is configured to estimate a dielectric constant of the object to be heated by comparing the TM/TE reflection ratio calculated by the arithmetic operation part with the data of the theoretical value in the database stored in the memory part, and the control part is configured to perform the frequency control of the microwave generated by the microwave oscillation part based on an estimated dielectric constant of the object to be heated.

8. The microwave heating device according to claim 7, wherein the microwave emission part is formed of at least a pair of microwave emission parts which are disposed at positions in the heating chamber where the microwave emission parts opposely face each other, and emits a microwave of the same frequency, and a phase of the microwave emitted from the pair of microwave emission parts is varied by phase varying parts disposed in the respective microwave guides disposed between the microwave oscillation part and the pair of microwave emission parts based on the estimated dielectric constant of the object to be heated.

9. The microwave heating device according to claim 7, wherein a reflection power detection part is disposed in the microwave guide disposed between the microwave oscillation part and the microwave emission part, and the control part is configured to perform a control based on the estimated dielectric constant of the object to be heated such that reflection power which is detected by the reflection power detection part and returns to the microwave emission part from the heating chamber becomes minimal.

10. The microwave heating device according to claim 7, wherein the microwave heating device further comprises a temperature sensor which is disposed in the heating chamber and detects a temperature in the heating chamber, and the control part is configured to calibrate the estimated dielectric constant of the object to be heated based on temperature information from the temperature sensor.

11. The microwave heating device according to claim 7, wherein the control part is configured to, in the angle control of the transmitting antenna and the receiving antenna, perform a switching control for switching a polarized wave of an electromagnetic wave to a TE wave or a TM wave at a plurality of antenna angles, and the arithmetic operation part is configured to calculate a TM/TE reflection ratio based on respective reflected waves of a TE wave and a TM wave from an object to be heated which the receiving antenna receives at the respective antenna angles.

12. The microwave heating device according to claim 7, wherein in the angle control of the transmitting antenna and the receiving antenna, the respective antenna angles exhibit the same angle with respect to a perpendicular of a measurement reference surface on a surface of an object to be heated.

13. The microwave heating device according to claim 7, wherein the receiving antenna has a half value angle which is wider than a half value angle of the transmitting antenna.

14. The microwave heating device according to claim 7, wherein the control part is configured to control a sum of the antenna angle of the transmitting antenna and the antenna angle of the receiving antenna within a range of 180 degrees.

15. The microwave heating device according to claim 7, wherein the control part is configured to set the antenna angle of the transmitting antenna and the antenna angle of the receiving antenna within a range of from 30 degrees to 40 degrees with respect to a perpendicular of a measurement reference surface on a surface of an object to be heated.

* * * * *

UNITED STATES PATENT AND TRADEMARK OFFICE
CERTIFICATE OF CORRECTION

| | | |
|---|---|---|
| PATENT NO. | : 11,700,676 B2 | |
| APPLICATION NO. | : 17/044450 | |
| DATED | : July 11, 2023 | |
| INVENTOR(S) | : Yoshihiro Sakamoto et al. | |

It is certified that error appears in the above-identified patent and that said Letters Patent is hereby corrected as shown below:

On the Title Page

In item (73) Assignee: insert -- WHIRLPOOL CORPORATION, Benton Harbor, MI (US) --

Signed and Sealed this
Fifth Day of November, 2024

Katherine Kelly Vidal
*Director of the United States Patent and Trademark Office*